(12) United States Patent
Hayashi

(10) Patent No.: US 9,594,985 B2
(45) Date of Patent: Mar. 14, 2017

(54) DATE IDENTIFICATION APPARATUS

(71) Applicant: PFU Limited, Ishikawa (JP)

(72) Inventor: Masayoshi Hayashi, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 127 days.

(21) Appl. No.: 14/792,079

(22) Filed: Jul. 6, 2015

(65) Prior Publication Data

US 2016/0275378 A1 Sep. 22, 2016

(30) Foreign Application Priority Data

Mar. 20, 2015 (JP) ................. 2015-058515

(51) Int. Cl.
*G06K 9/72* (2006.01)
*G06K 9/38* (2006.01)
(Continued)

(52) U.S. Cl.
CPC ........... *G06K 9/72* (2013.01); *G06K 9/00463* (2013.01); *G06K 9/183* (2013.01); *G06K 9/34* (2013.01);
(Continued)

(58) Field of Classification Search
CPC ...... G06K 9/72; G06K 9/4642; G06K 9/6212; G06K 9/78; G06K 9/00469; G06K 5/00; G06K 2209/01; G06K 9/18; G06K 9/183; G06K 9/34; G06K 9/38; G06K 9/00463; G06K 19/06028; G06K 9/4604; H04N 1/00843; H04N 5/225; H04N 1/4074;
(Continued)

(56) References Cited

U.S. PATENT DOCUMENTS 5,649,025 A * 7/1997 Revankar ............. G06T 7/0081
358/466
5,920,655 A * 7/1999 Makita ..................... G06K 9/38
382/270

(Continued)

FOREIGN PATENT DOCUMENTS

JP 62-271190 A 11/1987
JP 7-37032 A 2/1995
(Continued)

OTHER PUBLICATIONS

Notice of Rejection Japanese Patent Application No. 2015-058515 dated May 17, 2016 with English translation.

*Primary Examiner* — Manav Seth
(74) *Attorney, Agent, or Firm* — McDermott Will & Emery LLP

(57) ABSTRACT

A date identification apparatus includes: an isolator that isolates, out of image data generated through capturing of an image of a medium to which a date is assigned using seven-segment characters, date area data to which the date is estimated to be assigned; a binarization converter that binarizes the date area data using a threshold based on luminance and hue; a labeler that subjects the binarized date area data to labeling to extract target area data that is identifiable as a numeral; a numeral identifier that performs a histogram on at least the target area data using a plurality of lines and identifies a numeral on a basis of a peak count in each of the lines; and a date data assigner that assigns date data based on the identified numeral to the image data.

6 Claims, 26 Drawing Sheets

(51) Int. Cl.

| | | |
|---|---|---|
| G06K 9/34 | (2006.01) | |
| G06K 9/46 | (2006.01) | |
| H04N 1/407 | (2006.01) | |
| G06T 7/00 | (2006.01) | |
| G06K 9/00 | (2006.01) | |
| G06K 9/18 | (2006.01) | |
| G06K 9/62 | (2006.01) | |
| G06K 9/78 | (2006.01) | |
| H04N 5/225 | (2006.01) | |
| G07B 17/00 | (2006.01) | |

(52) U.S. Cl.
CPC ............ *G06K 9/38* (2013.01); *G06K 9/4604* (2013.01); *G06K 9/4642* (2013.01); *G06K 9/6212* (2013.01); *G06K 9/78* (2013.01); *G06T 7/0079* (2013.01); *H04N 1/4074* (2013.01); *H04N 5/225* (2013.01); *G06K 2209/01* (2013.01); *G07B 2017/00709* (2013.01)

(58) Field of Classification Search
CPC .. H04N 2201/3269; G06T 2207/20148; G06T 7/0079; G07B 2017/00725; G07B 2017/00709; G07D 7/0033
See application file for complete search history.

(56) References Cited

U.S. PATENT DOCUMENTS

| | | | | |
|---|---|---|---|---|
| 6,026,177 A * | 2/2000 | Mong | ................. | G06K 9/3233 382/156 |
| 6,064,762 A * | 5/2000 | Haenel | ................. | G06K 9/38 382/171 |
| 6,347,156 B1 * | 2/2002 | Kamada | ................. | G06K 9/38 358/1.9 |
| 6,470,094 B1 * | 10/2002 | Lienhart | ................. | G06K 9/325 382/171 |
| 6,628,833 B1 * | 9/2003 | Horie | ................. | H04N 1/40062 348/239 |
| 6,701,010 B1 * | 3/2004 | Katsuyama | ........... | G06T 7/0081 382/165 |
| 6,813,377 B1 * | 11/2004 | Gopalakrishnan | ... | G06K 9/6255 250/559.37 |
| 6,987,879 B1 * | 1/2006 | Suino | ................. | G06K 9/38 358/466 |
| 7,085,401 B2 * | 8/2006 | Averbuch | ................. | G06K 9/38 382/103 |
| 7,327,882 B2 * | 2/2008 | Wang | ................. | G06K 9/325 382/173 |
| 8,373,905 B2 * | 2/2013 | Erol | ................. | G06K 9/00442 358/1.13 |
| 8,600,167 B2 * | 12/2013 | Showering | ............ | G06K 9/228 382/190 |
| 8,620,078 B1 * | 12/2013 | Chapleau | ................. | G06K 9/344 382/173 |
| 8,873,856 B1 * | 10/2014 | Chapleau | ................. | G06K 9/344 382/105 |
| 8,929,663 B2 * | 1/2015 | Kondo | ................. | G06K 9/00463 382/199 |
| 9,092,892 B2 * | 7/2015 | Ozawa | ................. | G06T 11/001 |
| 2004/0165773 A1 * | 8/2004 | Katsuyama | ........... | G06T 7/0081 382/173 |
| 2004/0240734 A1 * | 12/2004 | Park | ................. | G06K 9/4647 382/170 |
| 2008/0310721 A1 * | 12/2008 | Yang | ................. | G06K 9/3275 382/182 |
| 2009/0310863 A1 | 12/2009 | Gallagher et al. | | |

FOREIGN PATENT DOCUMENTS

| | | |
|---|---|---|
| JP | 08-221512 A | 8/1996 |
| JP | 11-265030 A | 9/1999 |
| JP | 2000-042499 A | 2/2000 |
| JP | 2000-339472 A | 12/2000 |
| JP | 2004-260303 A | 9/2004 |
| JP | 2005-039801 A | 2/2005 |
| JP | 2011-525017 A | 9/2011 |
| JP | 2013-084071 A | 5/2013 |

* cited by examiner

FIG.1
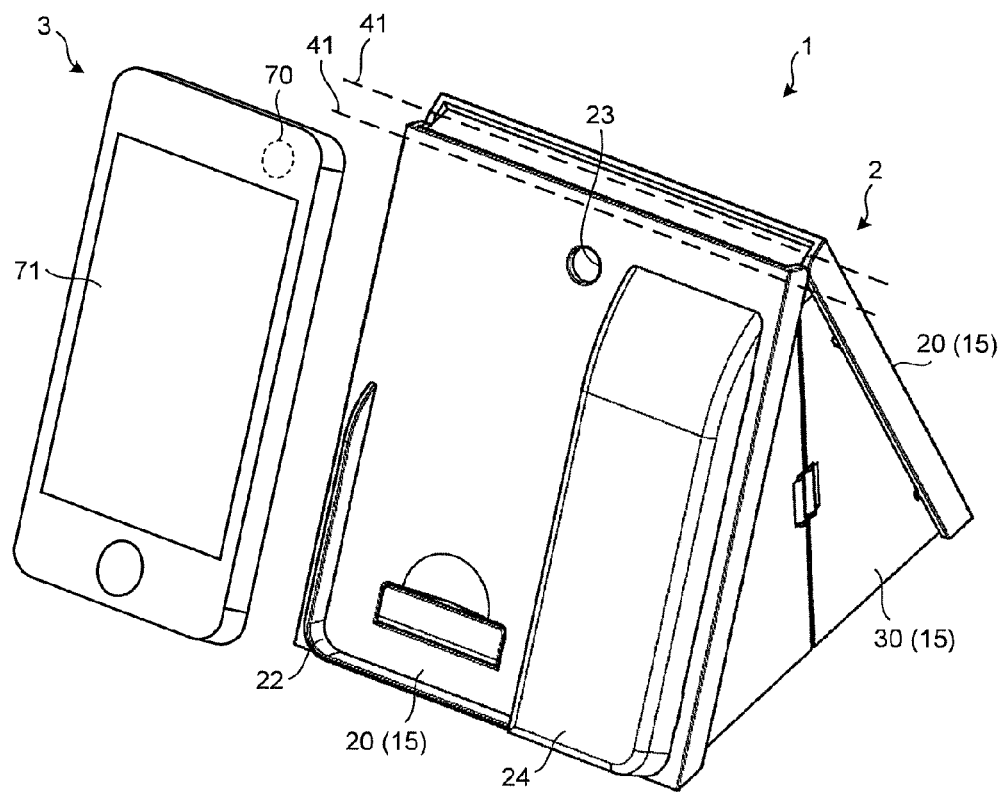
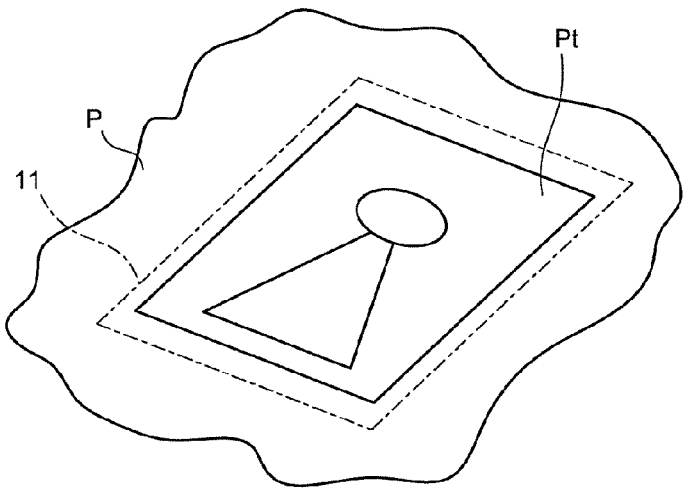

|  | ANY OBJECT OTHER THAN "1" | "1" |
|---|---|---|
| REFERENCE SIZE | 40×60 | 10×30 TO 60 |
| WIDTH-TO-HEIGHT RATIO (x:y) | 2:3 | 1:3 TO 6 |

FIG.28

| | 1 | 2 | 3 | 4 | 5 | 6 | 7 | 8 | 9 | 0 |
|---|---|---|---|---|---|---|---|---|---|---|
| LINE C | 0 | 3 | 3 | 1 | 3 | 3 | 1 | 3 | 3 | 2 |
| LINE D | 1R | 1R | 1R | 2 | 1L | 1L | 1R | 2 | 2 | 2 |
| LINE E | 1R | 1L | 1R | 1R | 1R | 2 | 1R | 2 | 1R | 2 |

DATE IDENTIFICATION APPARATUS

CROSS-REFERENCE TO RELATED APPLICATION(S)

The present application claims priority to and incorporates by reference the entire contents of Japanese Patent Application No. 2015-058515 filed in Japan on Mar. 20, 2015.

BACKGROUND OF THE INVENTION

1. Field of the Invention

The present invention relates to a date identification apparatus.

2. Description of the Related Art

Apparatuses are known that identify (or recognize) characters on paper or other medium on the basis of an image captured of the medium. Such an identification apparatus performs various types of image processing for the captured image to thereby enhance identification performance. For example, one known identification apparatus uses saturation or luminance of pixels in the image to classify each pixel within the image into a background, a character, and other elements, thereby allowing the character or the like to be identified (e.g., Japanese Patent Application Laid-open No. 2013-84071). Another known identification apparatus calculates a frequency histogram of luminance in the image, thereby binarizing the image on the basis of a binarization threshold so as to achieve a predetermined black ratio value (e.g., Japanese Patent Application Laid-open No. 08-221512).

Still another known identification apparatus uses a unique technique for identifying characters. Assume, for example, the character to be identified has a segment structure. The known identification apparatus has a dictionary memory prepared in advance for each character. The dictionary memory stores therein used segments and unused segments for each character. The known apparatus determines a character on the basis of the dictionary memory and data isolated from positions in the captured image corresponding to the segments (e.g., Japanese Patent Application Laid-open No. 2000-339472).

An extremely large amount of calculations is, however, involved in performing image processing to thereby sift through pixels that are likely to constitute a character and to determine whether these pixels are combined together to form a character. Additionally, in identifying a character having the segment structure and in determining whether each pixel in the image is one that constitutes a segment, a large amount of calculations is again involved in making an appropriate determination that can be difficult depending on the condition of the captured image.

One example of identifying a character in an image may be found in a case in which old photos are digitized for saving. The attempt to digitize the old photos may include, in order to sort the photos in chronological order, a step of identifying a date assigned to each photo as a result of the date being printed thereon. Specifically, in order to sort digitized data by the date, the date assigned to each photo is identified and the digitized data are sorted according to the identified date. Thus, when the digitized photos are sorted by the date, the identification apparatus is employed to identify the date assigned to each photo. If the photo is old, however, the date may be indistinct as a result of deterioration and the degree of deterioration may vary from one photo to another. In such a case, isolating pixels that constitute the date assigned to the photo is an extremely difficult task. This increases the amount of calculations required for the identification even further. Thus, the identification of the date is an extremely difficult task.

SUMMARY OF THE INVENTION

It is an object of the present invention to at least partially solve the problems in the conventional technology.

According to an aspect of the present invention, a date identification apparatus includes: an isolator that isolates, out of image data generated through capturing of an image of a medium to which a date is assigned using seven-segment characters, date area data to which the date is estimated to be assigned; a binarization converter that binarizes the date area data using a threshold based on luminance and hue; a labeler that subjects the binarized date area data to labeling to extract target area data that is identifiable as a numeral; a numeral identifier that performs a histogram on at least the target area data using a plurality of lines and identifies a numeral on a basis of a peak count in each of the lines; and a date data assigner that assigns date data based on the identified numeral to the image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is an illustration illustrating an appearance of a date identification apparatus according to an embodiment;

FIG. 28 is a table illustrating a relation between peak portions and a numeral when the numeral is to be identified on the basis of the peak portions of the projection histogram;

DETAILED DESCRIPTION OF THE PREFERRED EMBODIMENTS

The following describes in detail a date identification apparatus according to an embodiment of the present disclosure with reference to the accompanying drawings. The embodiment does not intend to limit the present invention.

In addition, the elements to be described with reference to the following embodiment include those that can be easily replaced by those skilled in the art and those achieved readily or those substantially identical.

Embodiment

Figure 2:
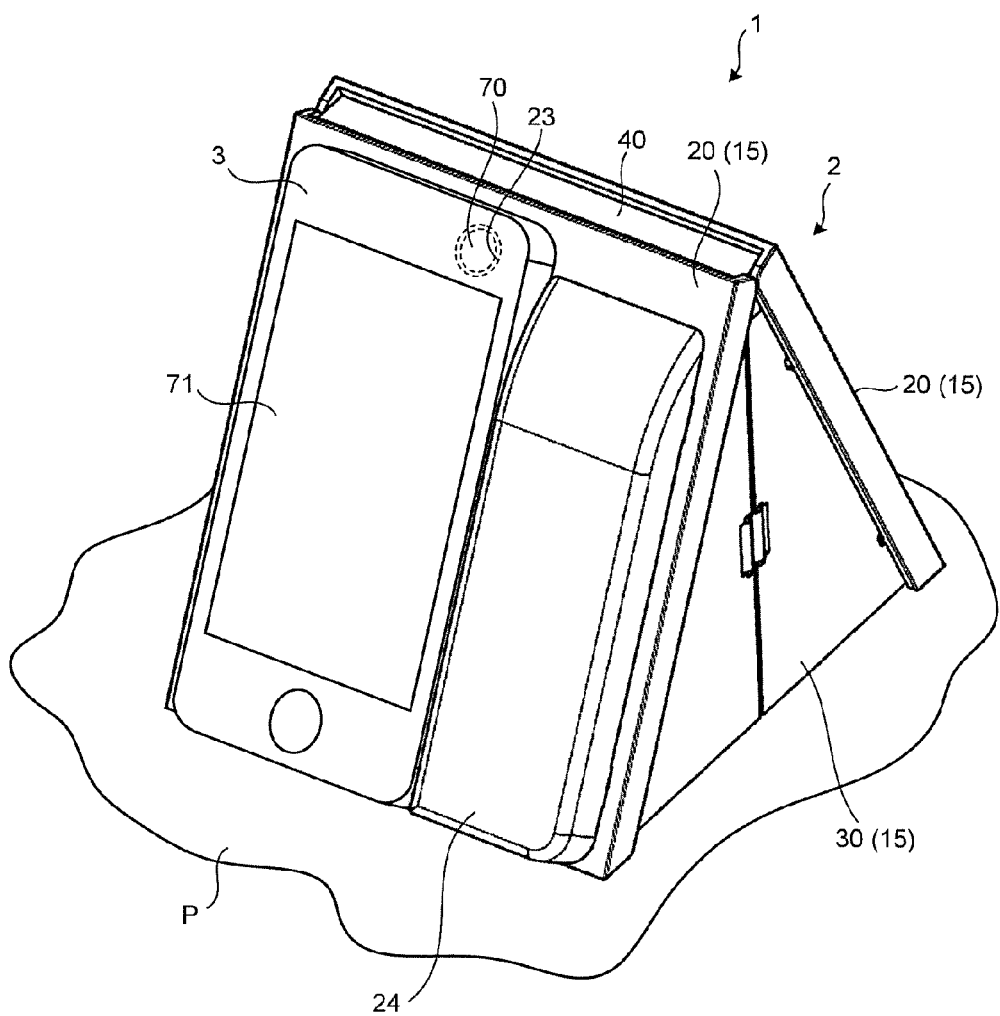
FIG. 2 is an illustration illustrating a use condition of the date identification apparatus according to the embodiment.

FIG. 1 is an illustration illustrating an appearance of the date identification apparatus according to the embodiment. FIG. 2 is an illustration illustrating a use condition of the date identification apparatus according to the embodiment. This date identification apparatus 1 according to the embodiment has a hand-carrying size. As illustrated in FIGS. 1 and 2, the date identification apparatus 1 includes an image capturing unit 70 that captures an image of a medium P to thereby generate image data corresponding to the medium P. The date identification apparatus 1 in the embodiment uses as the medium P a photo album in which silver halide photos and printed photos are compiled, to read a single photo in the photo album as a read target area Pt, thereby generating image data corresponding to the single photo in the photo album.

Intended uses of the date identification apparatus 1 in the embodiment are not limited to what is mentioned above. The date identification apparatus 1 of the embodiment can be applied to any types of medium on which image data is created by a user. The date identification apparatus 1 is applicable to generating image data corresponding to image data not only on glossy paper (such as a single silver halide photo, a single printed photo, and a magazine), but also on plain paper.

As illustrated in FIG. 1, the date identification apparatus 1 includes a housing 2 and an external device 3. The external device 3 includes the image capturing unit 70 that captures an image of an object, and a display unit 71 that displays any type of information. The image capturing unit 70 and the display unit 71 are disposed on faces of the external device 3 facing in opposite directions from each other. The external device 3 is used by installing therein a read application program corresponding to the function as the date identification apparatus 1 in advance or loading thereon the read application program from a recording medium (or downloaded). The external device 3 in the embodiment is, for example, a smartphone, a tablet, or other portable terminal that has telephone, Internet connecting, and other functions. The external device 3 has the function as the date identification apparatus 1 as part of its functions.

The housing 2 is capable of holding the external device 3 by being formed for an intended use with the external device 3 having defined outline dimensions and having the image capturing unit 70 at a defined position thereof or having outline dimensions falling within a predetermined range and a position of the image capturing unit 70 falling within a predetermined range. Specifically, for example, the housing 2 is formed for an intended use with the external device 3 in the same series. The housing 2 holds thereon the external device 3 when the date identification apparatus 1 reads the read target area Pt of the medium P.

Figure 3:
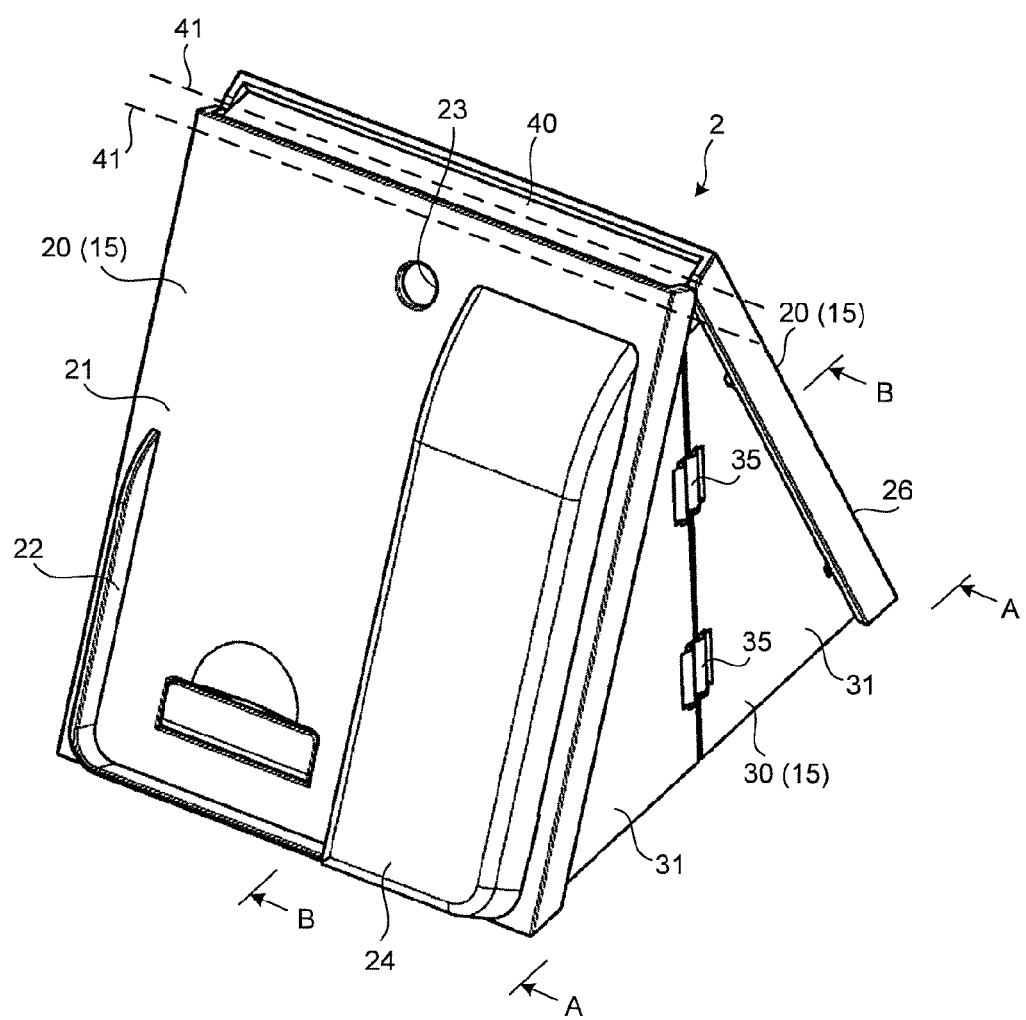
FIG. 3 is a perspective view illustrating a housing illustrated in FIG. 1.
Figure 4:
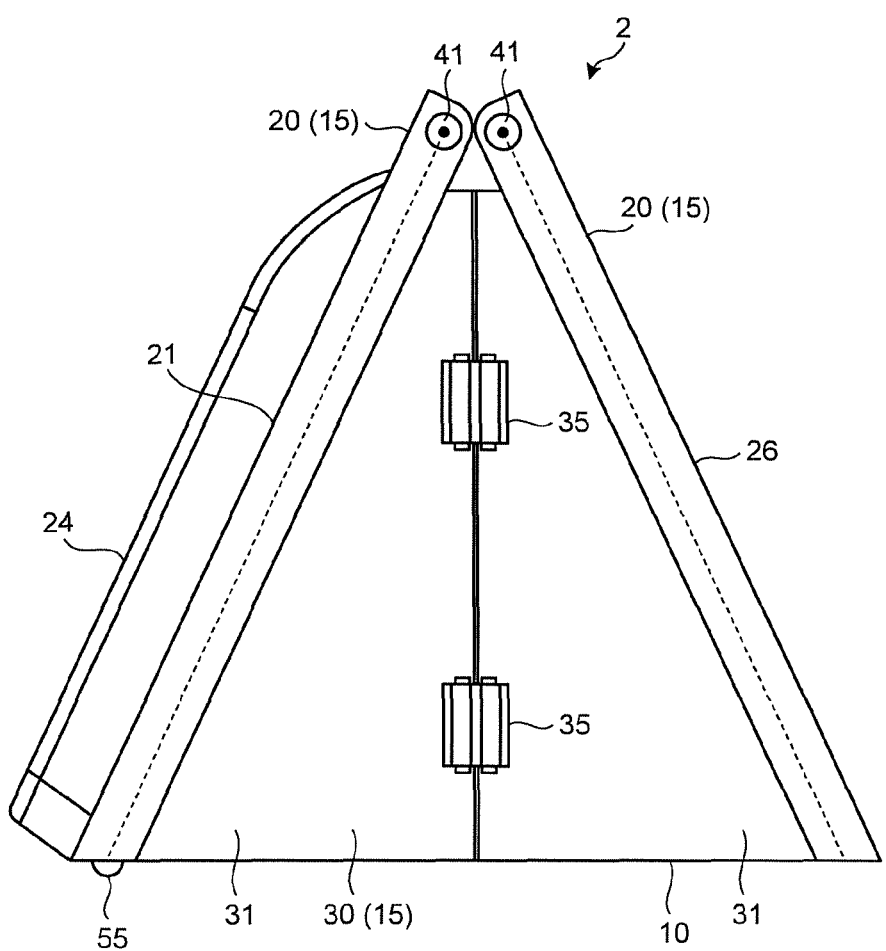
FIG. 4 is a view on arrow A-A in FIG. 3.
Figure 5:
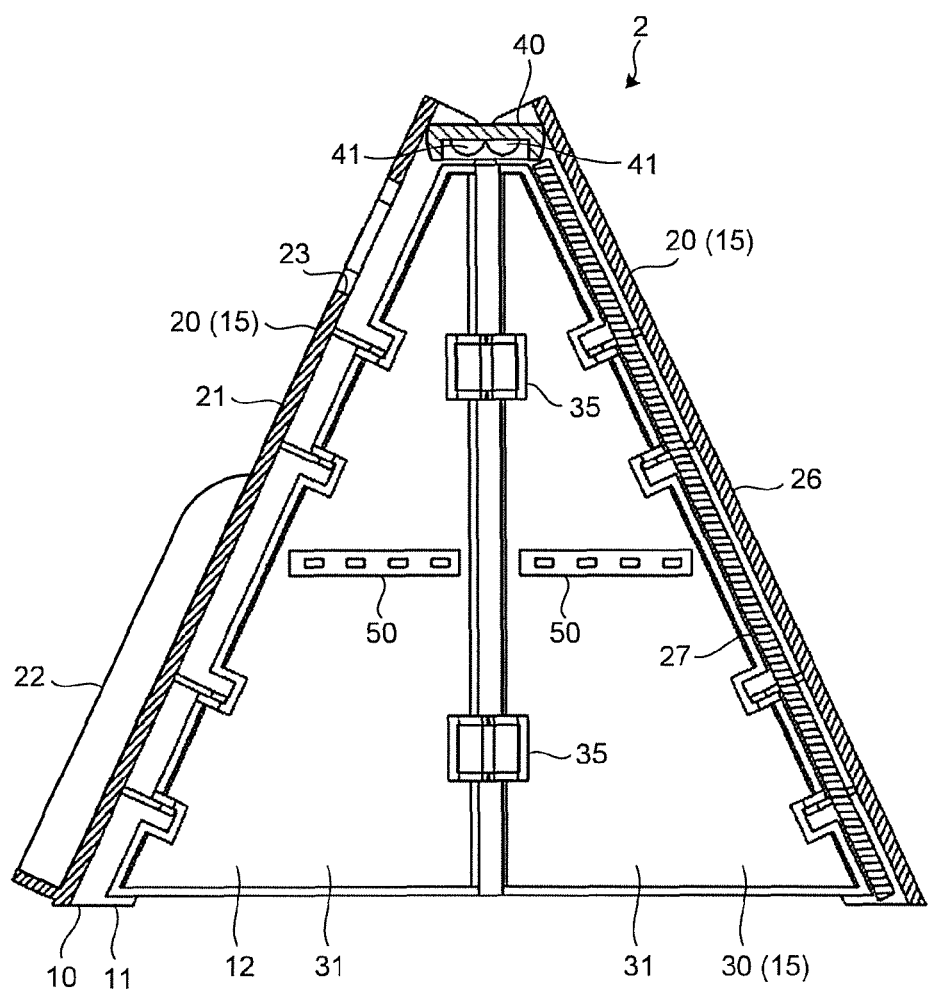
FIG. 5 is a cross-sectional view taken along line B-B in FIG. 3.

FIG. 3 is a perspective view illustrating the housing illustrated in FIG. 1. FIG. 4 is a view on arrow A-A in FIG. 3. FIG. 5 is a cross-sectional view taken along line B-B in FIG. 3. The housing 2 is formed substantially into a triangular prism. Of three rectangular, what is called side surfaces that constitute the triangular prism, one side surface is open to form a rectangular opening 11. The opening 11 is formed to have an area such that a photo with at least a size L (89 mm×127 mm) can be fit inside the opening 11. The opening 11 preferably has an area that allows a gap to be formed between an outer edge of the opening 11 and an outer edge of the photo in a condition in which the center of the L-sized photo is aligned with the center of the opening 11, the area being, for example, 102 mm×140 mm.

When the date identification apparatus 1 is in a use position, the housing 2 is positioned so that the opening 11 is disposed on a lower side to be open downwardly. To state the foregoing differently, the housing 2 has the opening 11 formed in a bottom surface 10 thereof. Because of the opening 11 formed in the bottom surface 10 as described above, the housing 2 can block thereinside ambient light that illuminates the housing 2 from an ambience of the housing 2.

The housing 2 formed as described above includes two side surfaces excluding the bottom surface 10 of the three side surfaces constituting the triangular prism as the shape of the housing 2 and two triangular bases constituting the triangular prism. Each of the two side surfaces and the two triangular bases is formed as a covering portion 15. The four covering portions 15 are each associated with a corresponding one of four sides of the rectangular opening 11.

The four covering portions 15 comprise two sets of covering portions 15, each set comprising two covering portions 15 that face each other. Of the two sets of covering portions 15, one set of covering portions 15 forms inclined covering portions 20. The inclined covering portions 20 are inclined in directions in which the covering portions 15 come closer together toward end portion sides opposite to sides on which the opening 11 is disposed. Specifically, the inclined covering portions 20 are formed of the two side surfaces, excepting the bottom surface 10, of the three side surfaces that constitute the triangular prism shape of the housing 2.

A first inclined covering portion 21 that is one of the two inclined covering portions 20 includes an external device holding section 22, an image capturing opening 23, and a power supply housing section 24. Specifically, the external device holding section 22 holds thereon the external device 3. The image capturing opening 23 serves as an opening through which the external device 3 captures an image of the medium P. The power supply housing section 24 houses therein a power supply 56 (see FIG. 6), such as a battery (not illustrated), used in the housing 2. The image capturing opening 23 has a hole that passes through the first inclined covering portion 21, providing communication between an outer surface side and an inner surface side of the housing 2 in the first inclined covering portion 21.

The external device holding section 22 is formed on the outer surface side of the housing 2 in the first inclined covering portion 21. The external device holding section 22 is formed so as to be able to hold the external device 3 at a position on the outer surface side of the housing 2 in the first inclined covering portion 21, so that the image capturing unit 70 of the external device 3 is positioned at a portion at which the image capturing opening 23 is formed. When the external device 3 is held on the external device holding section 22, the image capturing unit 70 is positioned at the position at which the image capturing opening 23 is formed. As a result, the image capturing unit 70 can capture an image of the medium P exposed to an inside of the housing 2 in the opening 11.

The first inclined covering portion 21 includes a grounding sensor 55 that serves as a closure detector detecting that the opening 11 is covered. The grounding sensor 55 is disposed on the side of the bottom surface 10 in the first inclined covering portion 21.

A second inclined covering portion 26 that is the other of the two inclined covering portions 20 includes a mirror 27 disposed on a surface thereof corresponding to the inner surface side of the housing 2. The mirror 27 on the inner surface side of the second inclined covering portion 26 is disposed so as to reflect an image of the medium P exposed to a housing inside 12 in the opening 11 to thereby allow the image capturing unit 70 to capture a reflected mirror image.

Positional relations among the mirror 27, the image capturing unit 70 of the external device 3 held on the external device holding section 22, and the opening 11 are set such that an image capturing area S (see FIG. 9) of the image capturing unit 70 through the mirror 27 is equal to, or wider than, an area of the opening 11. This arrangement enables the image capturing unit 70 to capture an image of an entire area of the medium P exposed to the housing inside 12 in the opening 11 in a condition in which the image capturing unit 70 is positioned at the position of the image capturing opening 23 by the external device 3 being held on the external device holding section 22.

Of the four covering portions 15 in two sets, each set comprising two covering portions 15 that face each other, the other set of covering portions 15 serves as connecting covering portions 30, each connecting the two inclined covering portions 20 together. The connecting covering portions 30 are formed by the two, what is called bases that constitute the triangular prism as the shape of the housing 2.

Of the covering portions 15, the two inclined covering portions 20 are arranged such that a first inclined covering portion 20 is relatively movable with respect to a second inclined covering portion 20. This arrangement results in the inclined covering portions 20 taking either one of two different positions, one being an open position in which end portions of the two inclined covering portions 20 on the side adjacent to the opening 11 are spaced apart from each other (see FIG. 3) and the other being a folded position in which the two inclined covering portions 20 extend in parallel with each other (see FIGS. 7 and 8). Specifically, the inclined covering portions 20 each have a pivotal shaft 41 that is disposed on the end portion side opposite to the side on which the opening 11 is disposed and that extends across the two connecting covering portions 30. The inclined covering portions 20 are each capable of rotating about the pivotal shaft 41. The pivotal shaft 41 is disposed on the end portion side in the inclined covering portion 20, opposite to the side on which the opening 11 is disposed so as to allow the inclined covering portion 20 to rotatably connect to a rotary covering portion 40 that extends from a side on which a first connecting covering portion 30 is disposed to the other side on which a second connecting covering portion 30 is disposed.

The connecting covering portions 30 each include a plurality of rotating members 31 connected rotatably to each other. Specifically, the two connecting covering portions 30 are each divided into two parts, one being a portion connected rotatably to the first inclined covering portion 21 and the other being a portion connected rotatably to the second inclined covering portion 26. The divided parts each constitute the rotating member 31. The two rotating members 31 of one connecting covering portion 30 are connected rotatably to each other by connecting members 35. Thus, the connecting covering portion 30 includes the rotating members 31 that are connected rotatably to each other and connected rotatably to the respective inclined covering portions 20. When the two inclined covering portions 20 are in the folded position, the foregoing arrangement of the rotating members 31 allows the connecting covering portions 30 to be deformed with respect to the inclined covering portions 20 to thereby enter a space between the two inclined covering portions 20.

A plurality of light sources 50 are disposed in the housing inside 12. The light sources 50 are disposed so as to be able to emit light toward the opening 11 to thereby illuminate different areas on a horizontal plane in the opening 11. The light sources 50 disposed in the housing inside 12 are mounted on the two rotating members 31 of each of the connecting covering portions 30. Specifically, the light sources 50 are disposed at four places in the housing inside 12. The light sources 50 disposed in the housing inside 12 each form a light emitting module that includes a plurality of light emitting elements, such as light emitting diodes (LEDs) and laser diodes (LDs), arranged in a band shape. The light sources 50 receive electric power supplied from the power supply 56 (see FIG. 6) to light up, thereby emitting light.

Figure 6:
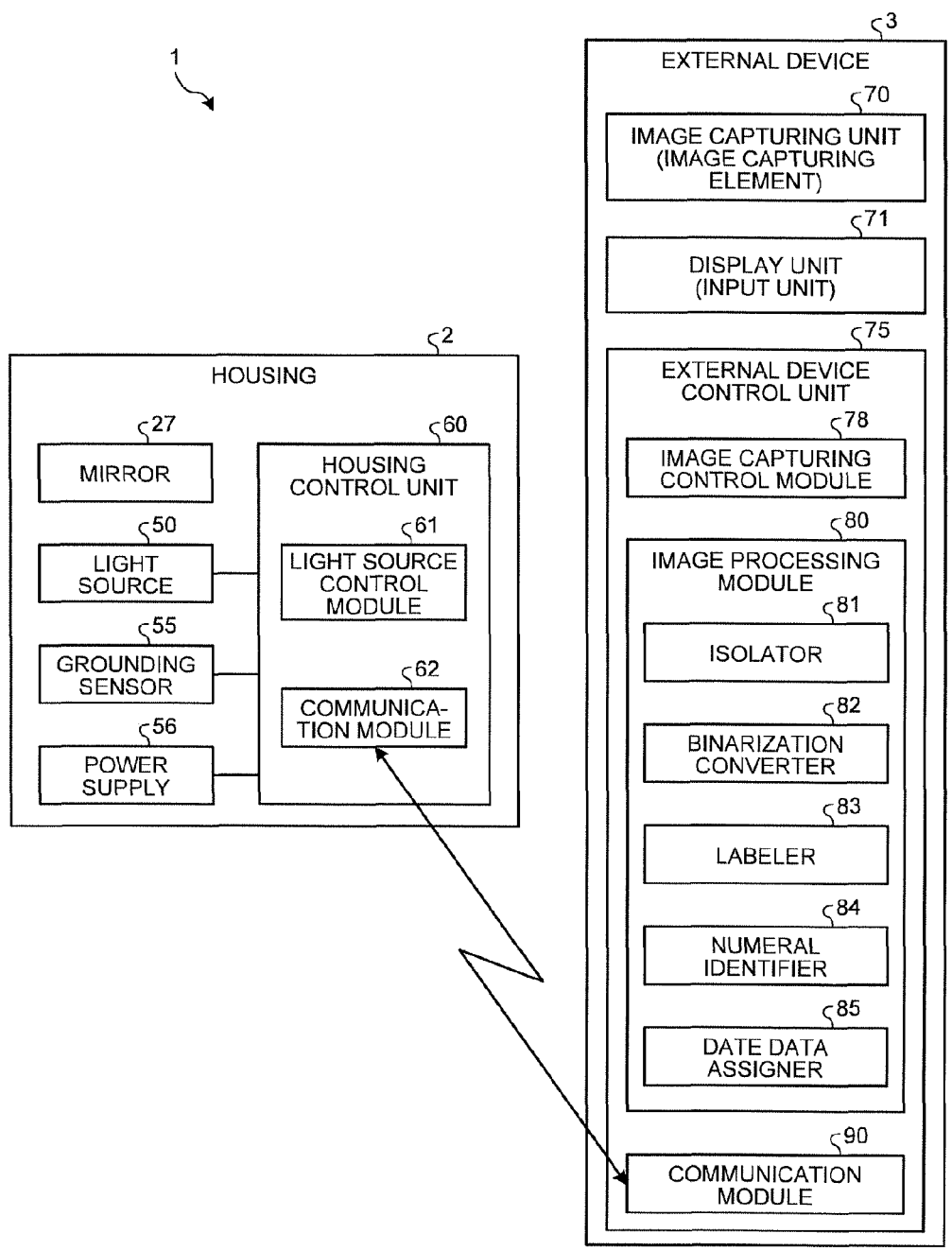
FIG. 6 is a functional block diagram illustrating the date identification apparatus illustrated in FIG. 1.

FIG. 6 is a functional block diagram illustrating the date identification apparatus illustrated in FIG. 1. The housing 2 that constitutes the date identification apparatus 1 with the external device 3 includes the mirror 27, the light sources 50, the grounding sensor 55, the power supply 56, and a housing control unit 60. The housing control unit 60 of the housing 2 is a computer that includes, for example, a central processing unit (CPU) that functions as a controller for performing various types of processing, and a random access memory (RAM) and a read only memory (ROM) each functioning as a memory for storing various types of information. All or part of the functions of the housing control unit 60 is enabled by loading an application program stored in the ROM onto the RAM and causing the CPU to perform the application program so as to read and write data in the RAM or ROM.

The light sources 50 and the grounding sensor 55 are electrically connected to the housing control unit 60. Thus, the housing control unit 60 can control to turn on or off the light sources 50 and receive a result of detection made by the grounding sensor 55. Specifically, the housing control unit 60 has a function as a light source control module 61 that controls a steady light state of the light sources 50. Through the control by the light source control module 61, the light sources 50 can control an intensity of light and timings of a steady light and off. At this time, the light source control module 61 can refer to the result of detection made by the grounding sensor 55 to control the steady light state of the light sources 50.

The power supply 56 housed in the power supply housing section 24 is also connected electrically to the housing control unit 60. The electric parts in the housing 2 are operable by the electric power supplied from the power supply 56. Non-limiting examples of the power supply 56 that supplies the electric power for operating the parts of the housing 2 include a primary battery, a secondary battery, and other types of batteries.

In addition, the housing control unit 60 includes a communication module 62 capable of communicating with the external device 3. The communication module 62 performs wireless communication through, for example, Bluetooth (a registered trademark). Any technique other than the Bluetooth may be employed to perform communication with the external device 3, including near field communication (NFC) and infrared communication. Such a technique is required only to be able to perform wireless communication between the external device 3 held on the external device holding section 22 and the housing 2.

The external device 3 includes the image capturing unit 70, the display unit 71, and an external device control unit 75. The external device 3 further includes a power supply unit (not illustrated) and a storage unit (not illustrated), in addition to the foregoing elements. The image capturing unit 70 is disposed on a reverse surface (a surface opposite to a surface on which the display unit 71 is disposed) of the external device 3. The image capturing unit 70 such as a CCD image sensor and a CMOS image sensor includes image capturing elements arrayed in a plane. The image capturing elements are driven by electric power supplied from the power supply unit. The image capturing unit 70 is configured such that the image capturing elements arrayed in a plane capture an image of an object within an image capturing range at once.

The display unit 71 can display any image including an image captured by the image capturing unit 70. The display unit 71 is disposed on the front surface of the external device 3 and serves as a display that includes a liquid crystal display, an organic EL display, or other type of display driven by electric power from the power supply unit of the external device 3. In addition to the function as an output unit of the external device 3, the display unit 71 serves also as a touch panel display having a function as an input unit. The display unit 71 thus can output an electric signal representing any position on the display unit 71 touched by the user. This arrangement allows the user to perform any input operation with respect to the external device 3.

The external device control unit 75 includes a computer having a CPU that functions as a controller for performing various types of processing and a RAM and a ROM that function as memories for storing various types of information. All or part of the functions of the external device control unit 75 is enabled by loading an application program stored in the ROM onto the RAM and causing the CPU to perform the application program so as to read and write data in the RAM or ROM.

The external device control unit 75 functionally includes an image capturing control module 78, an image processing module 80, and a communication module 90. The image capturing control module 78 can control the image capturing unit 70, performing control relating to image capturing, including adjustments of image capturing timing, exposure time, and focusing at the image capturing unit 70. The communication module 90 can perform communication with the communication module 62 of the housing 2 through, for example, the Bluetooth. The housing 2 and the external device 3 can perform communication wirelessly through the communication modules 62 and 90.

The image processing module 80 can process images captured by the image capturing unit 70. Specifically, when the image capturing unit 70 captures an image, each of the image capturing elements of the image capturing unit 70 outputs, for each exposure, an image signal on the basis of an output value corresponding to light incident thereupon to the image processing module 80. The image processing module 80 performs image processing, including generation of one piece of image data on the basis of this image signal.

The imaged read target area Pt is assumed to be a photo to which a date is assigned through printing of the date thereon. The image processing module 80 has a function of identifying the date from the image data. In order to identify the date from the image data, therefore, the image processing module 80 includes an isolator 81, a binarization converter 82, a labeler 83, a numeral identifier 84, and a date data assigner 85.

Of image data of the read target area Pt generated through capturing of an image of the medium P to which a date using seven-segment (or basic symbols) characters is assigned, the isolator 81 can isolate, from the image data, date area data that represents data on an area to which the date is estimated to be assigned. The binarization converter 82 can binarize the date area data isolated by the isolator 81 using a threshold based on luminance and hue. The labeler 83 can extract target area data that is identifiable as a numeral by subjecting the date area data binarized by the binarization converter 82 to labeling. The numeral identifier 84 performs a histogram on at least the target area data using a plurality of lines, thereby identifying a numeral using a peak count in each of the lines. The date data assigner 85 can assign date data based on the numeral identified by the numeral identifier 84 to the image data.

Figure 7:
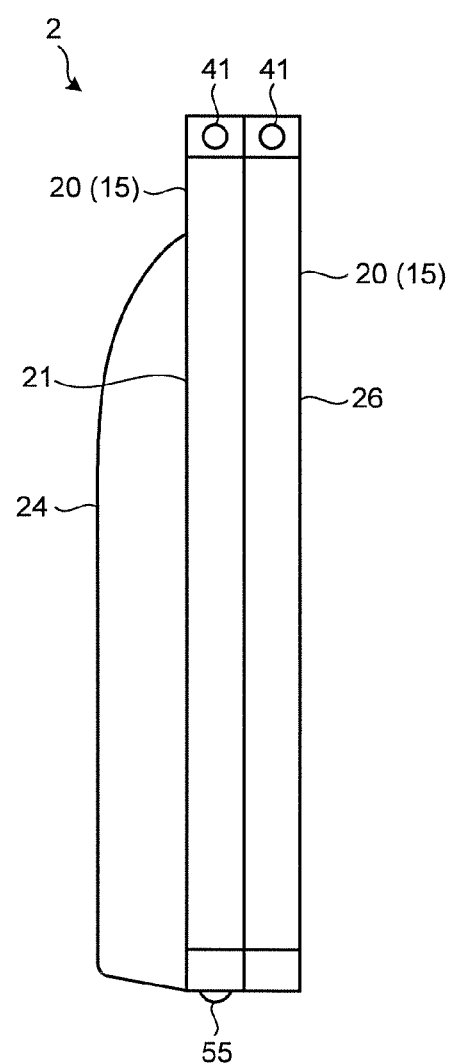
FIG. 7 is a side elevational view illustrating the housing in a folded position.
Figure 8:
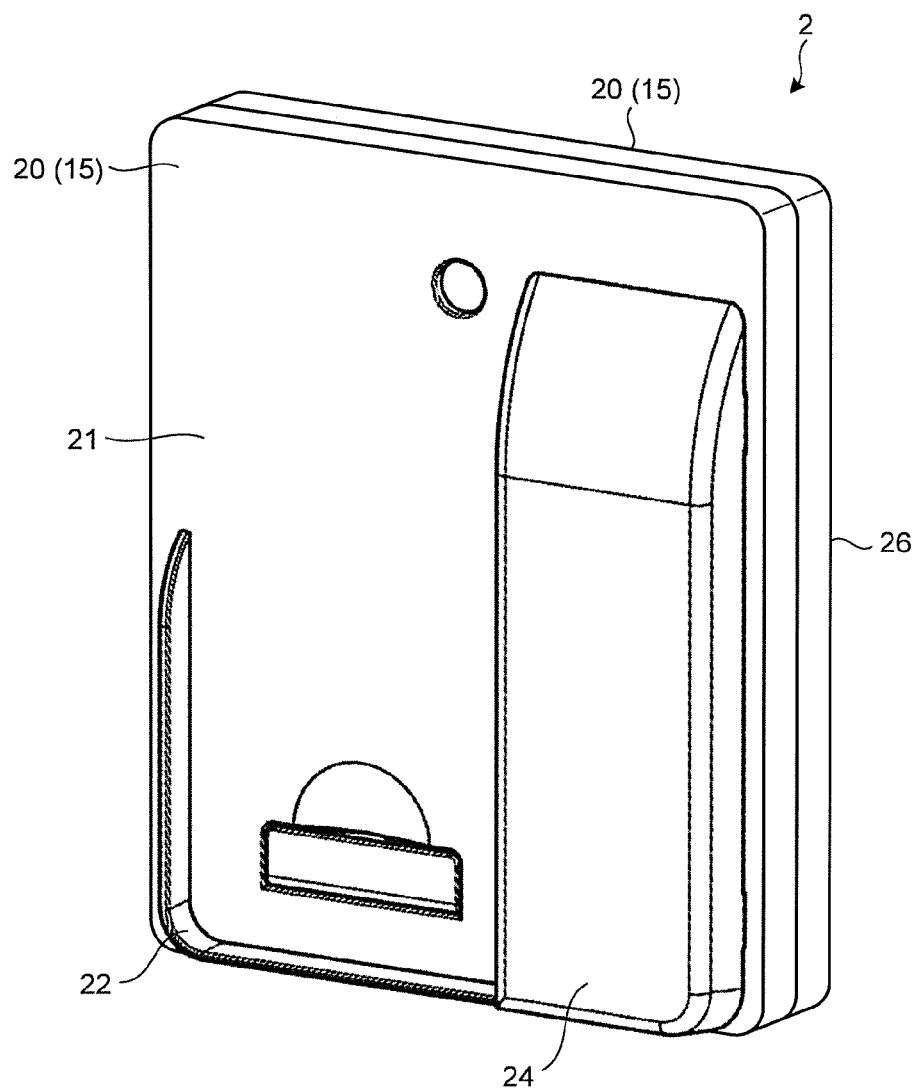
FIG. 8 is a perspective view illustrating the housing illustrated in FIG. 7.

The date identification apparatus 1 according to the embodiment is configured as described above. The following describes operations of the date identification apparatus 1. FIG. 7 is a side elevational view illustrating the housing in the folded position. FIG. 8 is a perspective view illustrating the housing illustrated in FIG. 7. The housing 2 of the date identification apparatus 1 can be folded when not in use and can be stored or carried in a compactly folded position. To fold the housing 2, the two inclined covering portions 20 are each rotated about the pivotal shaft 41 in a direction in which the end portion sides in the two inclined covering portions 20 adjacent to the side on which the opening 11 is disposed approach each other, thereby bring close together the inclined covering portions 20. At this time, the connecting covering portions 30 connected to the respective inclined covering portions 20 enter a space between the inclined covering portions 20 when the rotating members 31 rotate with respect to the inclined covering portions 20 and, at the same time, the rotating members 31 connected by the connecting members 35 rotate with respect to each other. These movements bring the two inclined covering portions 20 into a mutually overlapping position and the housing 2 into a substantially rectangular panel shape having a width doubling a width of one inclined covering portion 20. The result is a compactly shaped housing 2.

Figure 9:
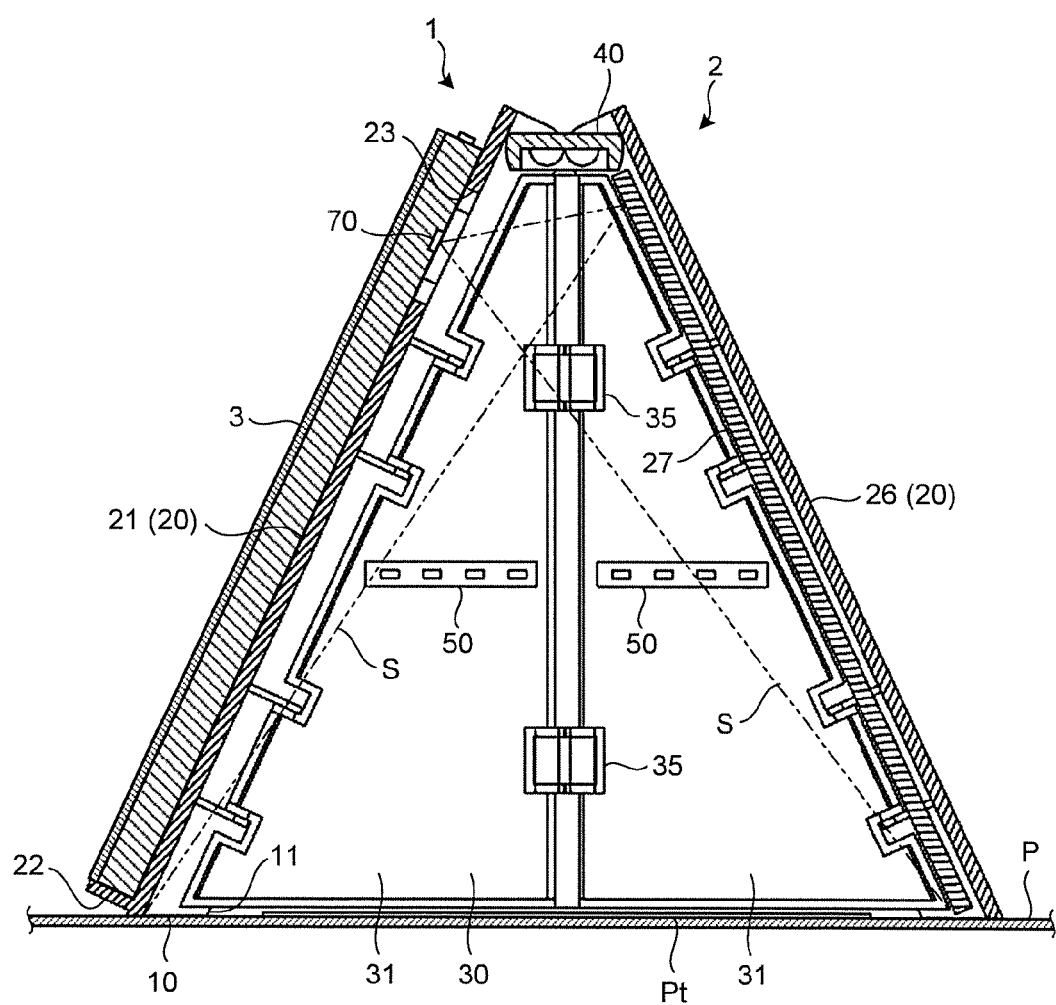
FIG. 9 is an illustration for illustrating a condition in which an image is read by the date identification apparatus illustrated in FIG. 1.

FIG. 9 is an illustration for illustrating a condition in which an image is read by the date identification apparatus illustrated in FIG. 1. To read the medium P with the date identification apparatus 1, the housing 2 is brought into an open position by rotating the two inclined covering portions 20 about the respective pivotal shafts 41 to thereby space the inclined covering portions 20 apart from each other. Under this condition, the open housing 2 is placed over the medium P so that the read target area Pt of the medium P is disposed within the opening 11. When the housing 2 is placed over the medium P, the grounding sensor 55 disposed on the bottom surface 10 detects that the bottom surface 10 is in a contact state, whereby the housing 2 detects that the opening 11 is covered. When the opening 11 is determined to be covered, the light source control module 61 lights up the light sources 50. After the housing 2 has been placed over the medium P, the external device 3 is held on place in the external device holding section 22 so that the image capturing unit 70 faces the image capturing opening 23. This setting allows the image capturing unit 70 to capture an image inside the housing 2 through the image capturing opening 23 and to read the image of the medium P reflected by the mirror 27 inside the housing 2.

When the external device 3 is held on the external device holding section 22, the external device 3 should be held on the external device holding section 22 in a condition, for example, in which a read application program associated with the function as the date identification apparatus 1 is started, thereby being capable of reading the medium P using the read application program. When the read application program is running, the display unit 71 of the external device 3 displays an image in accordance with an image data signal output from the image processing module 80, the image being currently captured by the image capturing unit 70. Thus, when the read application program is running on the external device 3 held on the external device holding section 22, the display unit 71 displays an image of the medium P reflected by the mirror 27 and currently captured by the image capturing unit 70.

Additionally, while the read application program is running, the display unit 71 of the external device 3 displays a shutter as an icon. When the user touches the shutter icon to thereby depress the shutter, the read application program causes the image capturing control module 78 to output an image capturing command signal that directs image capturing by the image capturing unit 70 to the image capturing unit 70, so that an image is read on the basis of the image captured by the image capturing unit 70. Specifically, the image processing module 80 performs required image processing for the image data captured by the image capturing unit 70 and the processed image data is stored in the storage unit of the external device 3.

The image processing performed by the image processing module 80 for the image data includes, for example, correcting an image distorted as a result of capturing the read target area Pt from obliquely above to an image of the read target area Pt viewed from above. In addition to the processing performed for the very image, the image processing performed by the image processing module 80 for the image data also includes identifying a date assigned to the photo and assigning the date to the image data. Specifically, when the read target area Pt is a photo to which a date is assigned through printing of the date having characters, each character being represented by seven segments, i.e., a seven-segment character, the image processing also includes identifying the date represented by the seven-segment characters and assigning the date to the image data.

Figure 10:
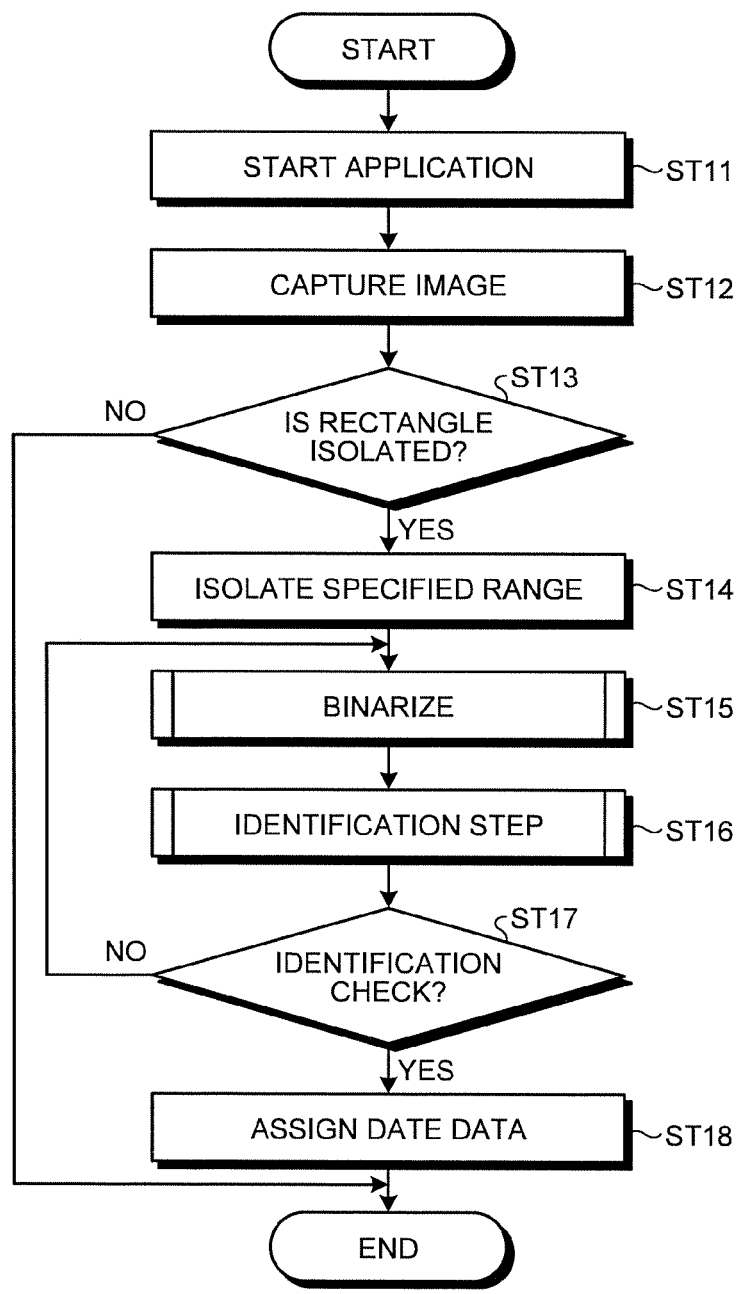
FIG. 10 is a flowchart illustrating processing steps performed when the date identification apparatus according to the embodiment identifies a date on a photo.

FIG. 10 is a flowchart illustrating processing steps performed when the date identification apparatus according to the embodiment identifies the date on the photo. Assume a process in which an image to which a date is assigned is captured as the read target area Pt captured by the date identification apparatus 1, the date is identified from the image data obtained in the capturing, and the identified date is assigned to the image data. To perform this process, an application program for performing the process is first started (step ST11). This application program is stored in the RAM or ROM of the external device 3 and is started when the user performs an input operation with respect to the display unit 71.

When the application program has been started, the image of the medium P is captured (step ST12). At this time, an input operation for directing image capturing is performed, with the housing 2 placed over the medium P, with respect to the display unit 71 of the external device 3 held on the external device holding section 22 of the housing 2, to thereby capture the image of the medium P that is the photo to which a date is assigned.

A determination is then made as to whether a rectangle has been successfully isolated from the image data obtained through the image capturing (step ST13). This determination is made by the image processing module 80 of the external device 3. Specifically, the image processing module 80 isolates, from the image data of the medium P captured by the external device 3, the read target area Pt in which the photo is disposed as a rectangle having an outline extending along an outline of the photo, and determines whether the rectangle has been successfully isolated. If it is determined that the isolation of the rectangle has not been successful (No at step ST13), the operation exits from this process. Specifically, when the isolation of the rectangle has not been successful, a step for identifying the date on the captured photo is not performed and the process for identifying the date is terminated.

If it is determined that the isolation of the rectangle has been successful (Yes at step ST13), isolation of a specified range is performed (step ST14). This isolation of the specified range is performed by the isolator 81 of the image processing module 80 in the external device 3. The isolator 81 isolates the specified range from the image data previously isolated into the rectangle.

Figure 11:
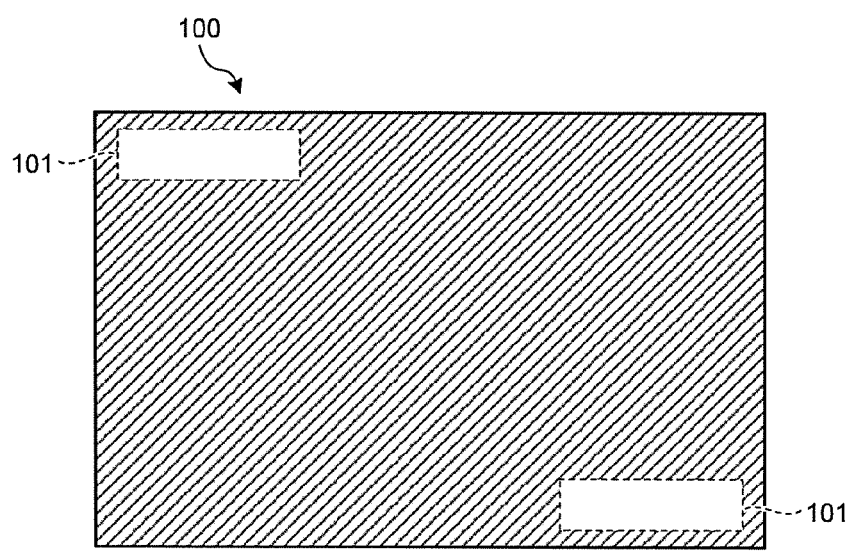
FIG. 11 is an illustration for illustrating isolation of a rectangle.

FIG. 11 is an illustration for illustrating the isolation of a rectangle. The isolator 81 isolates date area data 101 as a specified range to be isolated from rectangular image data 100. Specifically, in photos to which a date is assigned, the date is likely to be assigned to an upper left position or a lower right position of the rectangular photo as viewed in a landscape orientation. In addition, the date is typically represented by numerals indicating a year, a month, and a day, arranged in a horizontal width direction, so that the area representing the date is horizontally long when viewed generally. Thus, the isolator 81 isolates specified ranges, each having a horizontally long rectangular shape, from the upper left position and the lower right position in the image data 100 isolated as a rectangle, to thereby isolate the date area data 101 in which the date is estimated to be assigned.

The isolated date area data 101 is then binarized (step ST15). This binarization step is performed by the binarization converter 82 of the image processing module 80 in the external device 3. To perform the binarization step, the binarization converter 82 calls a subroutine that performs the binarization step.

Figure 12:
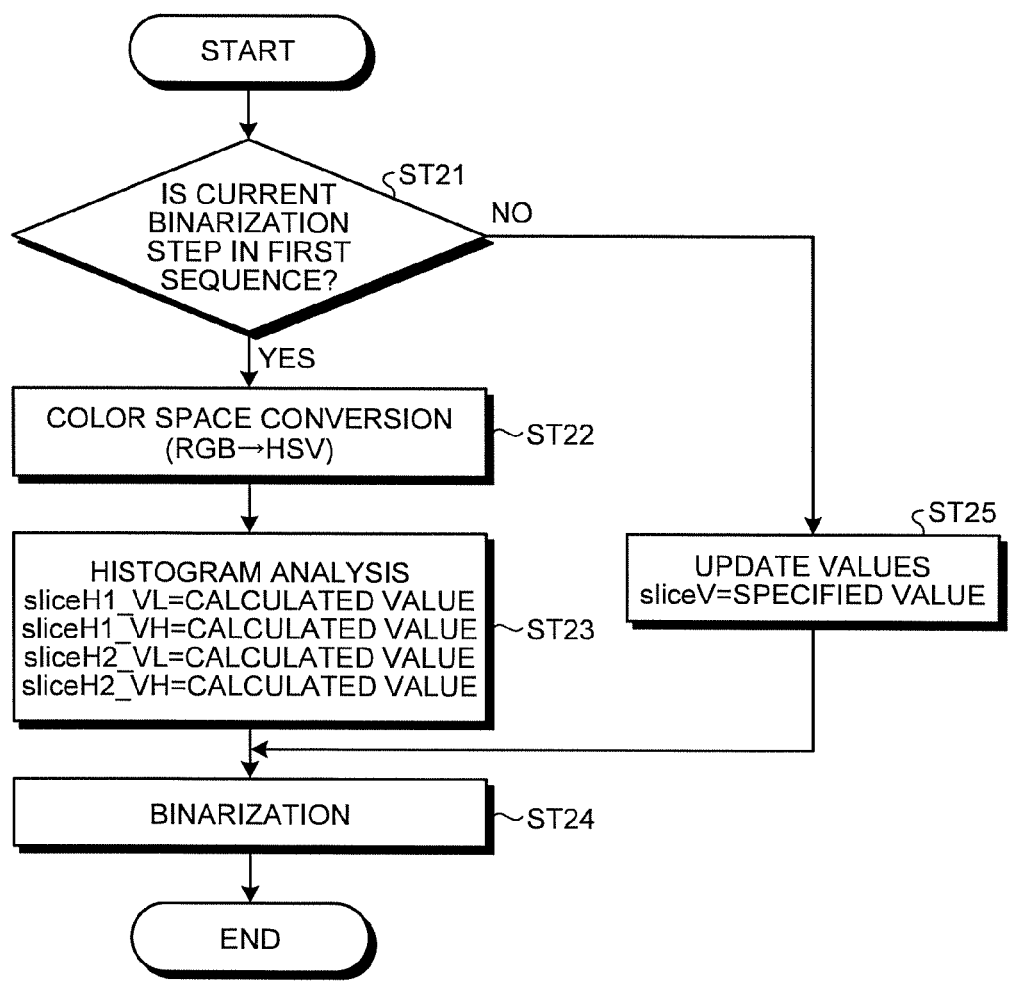
FIG. 12 is a flowchart illustrating a binarization step.

FIG. 12 is a flowchart illustrating the binarization step. In the subroutine that performs the binarization step, the binarization converter 82 determines whether the current binarization step is in a first sequence (step ST21). Specifically, because the binarization step for the date area data 101 is performed through feedback, the process at this stage determines whether the current binarization step is in the first sequence before the feedback.

If it is determined that the current binarization step is in the first sequence (Yes at step ST21), color space conversion is performed (step ST22). Specifically, the date area data 101 digitized as an RGB color model represented by the three primary colors of red (R), green (G), and blue (B) is converted to corresponding data represented in an HSV color space composed of the three components of hue, saturation, and value (or luminance).

When the date area data 101 has been converted to the corresponding data in the HSV color space, a histogram analysis is performed (step ST23). The histogram analysis is performed on the hue and the value of the date area data 101 converted to the data in the HSV color space. The histogram analysis performed on the hue will be described first. To perform a histogram analysis of the hue, the binarization converter 82 performs histogram extraction of the hue.

Figure 13:
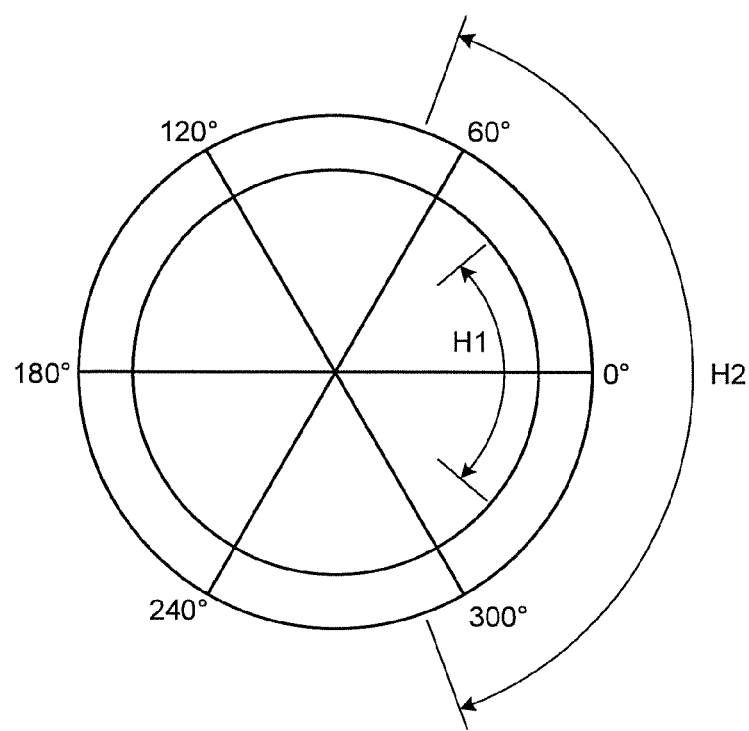
FIG. 13 is an illustration for illustrating histogram extraction of hue.

FIG. 13 is an illustration for illustrating the histogram extraction of the hue. The hue can represent different colors over a 0-to-360-degree range. For the histogram extraction of the hue performed by the binarization converter 82, a desired color in the hue is set as 0 degrees and colors falling within a desired range about the 0 degrees are extracted. Specifically, the date assigned to photos is commonly indicated by an orange-based color. Of the colors indicated by 0 to 360 degrees, the portion of an orange-based color that is the most likely color of the date is defined as 0 degrees and colors falling within a predetermined range about 0 degrees are extracted. Assume, for example, condition H1 and condition H2 are set as hue conditions, the condition H1 be ±40 degrees, the condition H2 be ±80 degrees. Of pixels that constitute the date area data 101, pixels of colors satisfying the condition H1 and pixels of colors satisfying the condition H2 are extracted. Histogram extraction of the hue is thereby performed. The extracted hue histogram is then subjected to logarithmization and data weighting to thereby make data easier to handle.

Binarization slice values are next calculated using a value histogram. Specifically, the value histogram is used to calculate thresholds to be used whether to set 1 or 0 for each pixel during the binarization. For example, condition V1 and condition V2 are set as the conditions for the value. For the condition V1, an 80% value in the value histogram of the entire date area data 101 is calculated as the threshold and, for the condition V2, a 40% value in the value histogram of the entire date area data 101 is calculated as the threshold. A histogram analysis is then performed using the value thresholds thus calculated and the hue conditions to determine whether each of pixels constituting the date area data 101 satisfies the two conditions.

Specifically, to perform the histogram analysis, the following thresholds are first calculated: specifically, sliceH1_VL as a threshold using the hue condition H1 and the value condition V1, sliceH1_VH as a threshold using the hue condition H1 and the value condition V2, sliceH2_VL as a threshold using the hue condition H2 and the value condition V1, and sliceH2_VH as a threshold using the hue condition H2 and the value condition V2. A determination is then made as to whether the hue and the value of each of the pixels constituting the date area data 101 satisfy each of the calculated thresholds. The binarization converter 82 thus performs the histogram analysis of the date area data 101.

Following the histogram analysis performed of the date area data 101, binarization is performed (step ST24). Specifically, the binarization converter 82 sets each of the pixels constituting the date area data 101 satisfying the calculated thresholds to 1 and sets each of the pixels constituting the date area data 101 not satisfying the calculated thresholds to 0, thereby binarizing the date area data 101. The date area data 101 is binarized and converted to, for example, data composed of black and white only through conversion of pixels having a value of 1 to black and conversion of pixels having a value of 0 to white. The binarization converter 82 binarizes the date area data 101 using the thresholds based on the value and the hue as described above. On completing the binarization of the date area data 101, the operation returns to the former process performed when the date identification apparatus 1 identifies the date on the photo.

If it is determined that the current binarization step is not in the first sequence (No at step ST21), values used for the histogram analysis are updated (step ST25). Specifically, if the date cannot be identified during a date identification step to be described later, the condition of the histogram is fed back to the subroutine of the binarization step to thereby update the values used for the histogram analysis. Specifically, a sliceV used as a threshold for the value is determined a specified value. When the values used for the histogram analysis have been updated and the histogram analysis has been performed, binarization is performed (step ST24) before the operation returns to the former process.

When the operation returns to the former process from the binarization step, a numeral identification step is next performed for the binarized date area data 101 (step ST16). The identification step is performed by the labeler 83 of the image processing module 80 in the external device 3. To perform the identification step, the labeler 83 calls a subroutine that performs the identification step.

Figure 14:
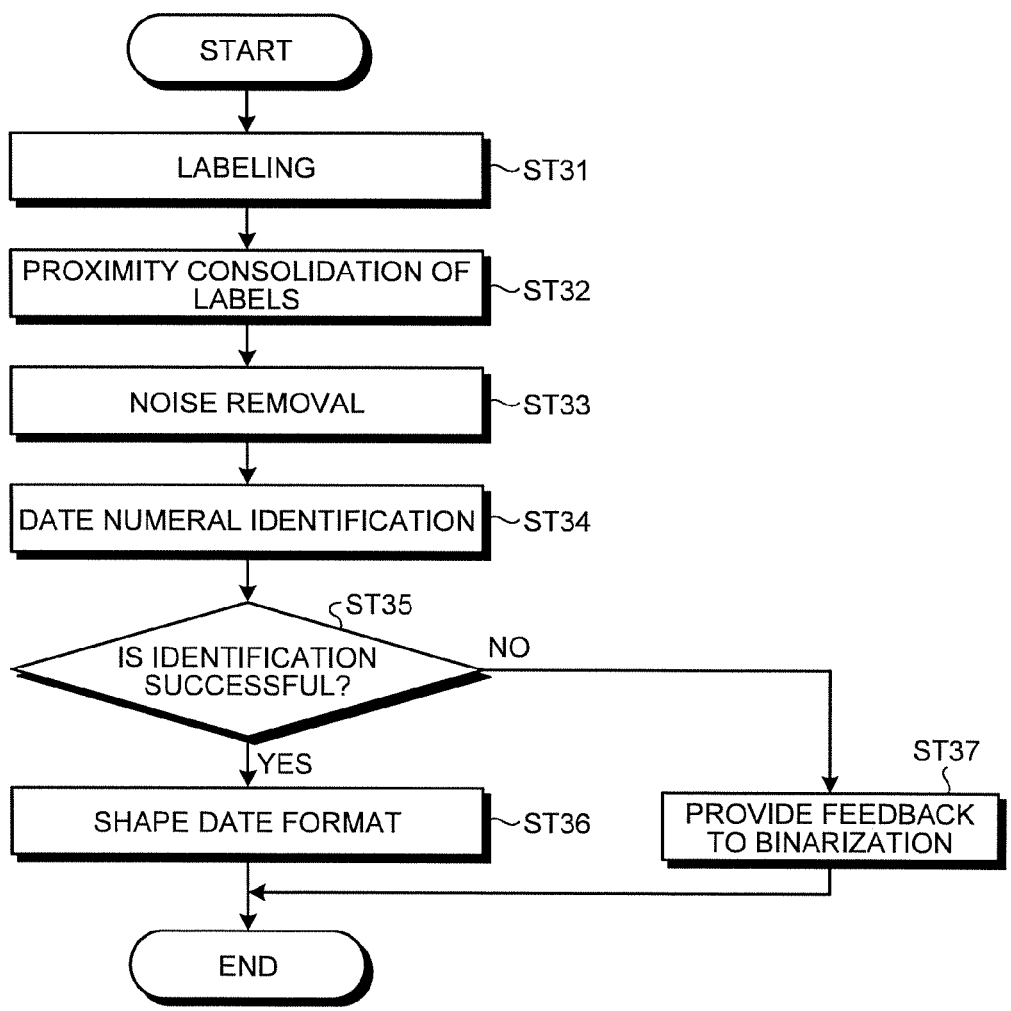
FIG. 14 is a flowchart illustrating an identification step.

FIG. 14 is a flowchart illustrating the identification step. In the subroutine that performs the identification step, the binarized date area data 101 is subjected to labeling (step ST31). The labeling is performed by the labeler 83.

Figures 15, 16:
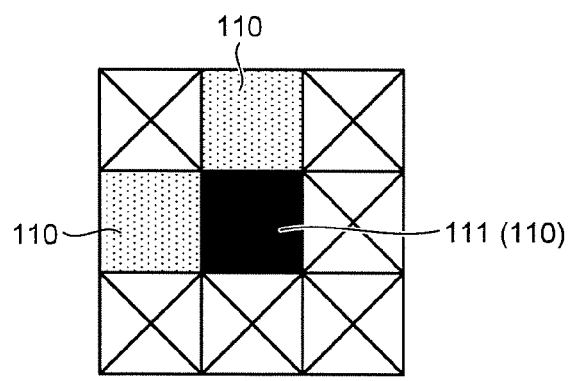
FIG. 15 is an illustration for illustrating labeling performed for binarized date area data.
FIG. 16 is an illustration for illustrating a method for checking other pixels during assignment of a label number to a specific pixel.

FIG. 15 is an illustration for illustrating the labeling performed for the binarized date area data. During the labeling performed by the labeler 83, raster scanning is performed of a plurality of pixels 110 that are arrayed in height and width directions to thereby constitute the date area data 101. Specifically, for example, the date area data 101 composed of the black and white pixels 110 generated by the binarization is scanned from the pixel 110 on the upper left corner rightward. When the pixel on the right end is reached, the date area data 101 is scanned again starting at the pixel 110 on the left end down one line thereof toward the right end. These steps are repeated until all pixels 110 constituting the date area data 101 are scanned for the labeling. In the labeling, these scanning sequences are performed to search for black pixels 110. When a plurality of black pixels 110 are grouped together, one label number is assigned to these pixels 110.

FIG. 16 is an illustration for illustrating a method for checking other pixels during assignment of a label number to one pixel. When a black pixel 110 is detected through the raster scanning performed for the date area data 101, the detected pixel is defined as an interest pixel 111 and a check is made as to whether label numbers are assigned to the pixel 110 to the left of the interest pixel 111 and the pixel 110 immediately above the interest pixel 111.

Figure 17:
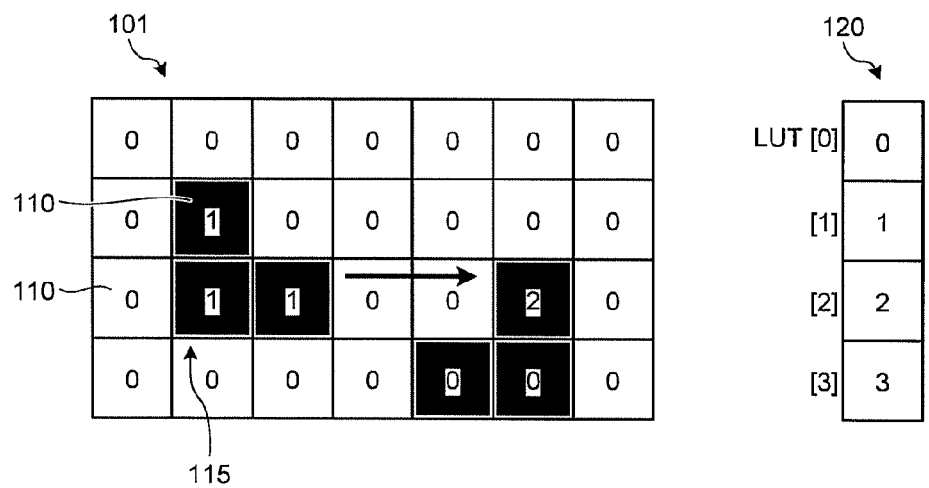
FIG. 17 is an illustration for illustrating a procedure for assigning label numbers.

FIG. 17 illustrates a procedure for assigning label numbers. If a label number is assigned to the pixel 110 to the left or above the interest pixel 111, the smallest label number of the detected label numbers is assigned to the interest pixel 111. Specifically, if the label number assigned to the pixel 110 left to the interest pixel 111 differs from the label number assigned to the pixel 110 above the interest pixel 111, the smaller label number is assigned to the interest pixel 111. If no label numbers are assigned to both the pixels 110 to the left and above the interest pixel 111, a new label number is assigned to the interest pixel 111 (see the pixel 110 having the label number "2" assigned thereto in FIG. 17). Specifically, the value of the label number assigned last+1 is assigned to the interest pixel 111. When the pixels 110 have been labeled in the above-described manner, the labeler 83 regards the pixels 110 to each of which an identical label number is assigned as one label.

Figure 18:
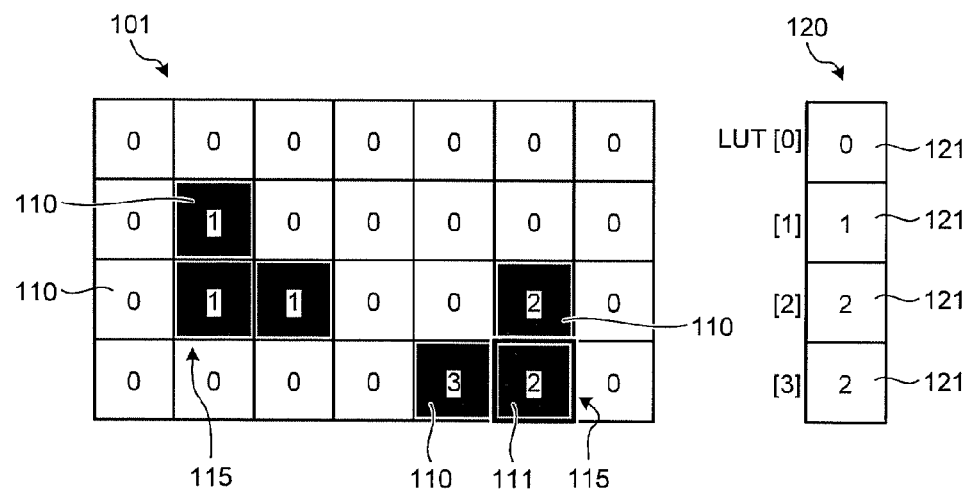
FIG. 18 is an illustration for illustrating rewriting of values in a lookup table (LUT)

FIG. 18 illustrates rewriting of values in a lookup table (LUT). When the label number assigned to the pixel 110 left to the interest pixel 111 differs from the label number assigned to the pixel 110 above the interest pixel 111 and when the smaller label number is assigned to the interest pixel 111, an LUT 120 used for reorganizing the label numbers is rewritten. For example, when the label number assigned to the pixel 110 to the left of the interest pixel 111 is "3" and the label number assigned to the pixel 110 above the interest pixel 111 is "2" as illustrated in FIG. 18, the smaller label number "2" is assigned to the interest pixel 111. In this case, of storages 121, each made available for each label number, in the LUT 120, the value of the storage 121 that stores data corresponding to the label number "3" is rewritten to "2".

Figure 19:
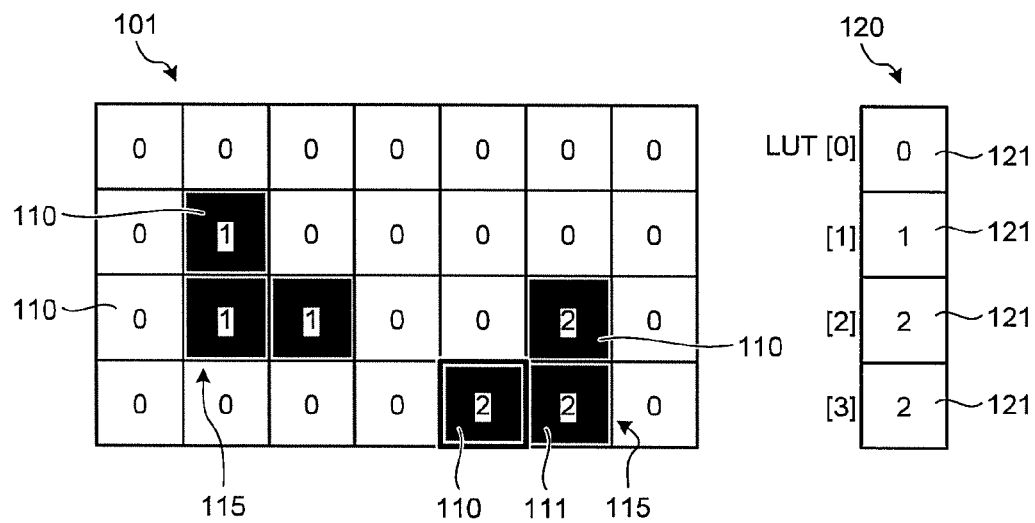
FIG. 19 is an illustration for illustrating how the label numbers are reorganized on the basis of the values in the LOT.

FIG. 19 illustrates how the label numbers are reorganized on the basis of the values in the LUT. When the value of the storage 121 corresponding to the label number "3" in the LUT 120 is rewritten to "2", of the label numbers assigned to the pixels 110 of the date area data 101, the label number of the pixel 110 to which the label number "3" is assigned is rewritten in accordance with the LUT 120. Specifically, because "2" is set in the storage 121 in the LUT 120 which has had the label number "3", the label number of the pixel 110 among the pixels 110 of the date area data 101 to which the label number "3" is assigned is rewritten to "2". For example, when the label number of the pixel 110 to the left of the interest pixel 111 in FIG. 18 is "3", the value of the storage 121 corresponding to the label number "3" in the LUT 120 is rewritten to "2", so that the label number of the pixel 110 to the left of the interest pixel 111 is also rewritten to "2".

The LUT 120 is used, when the label numbers differ between the pixel 110 to the left of the interest pixel 111 and the pixel 110 above the interest pixel 111, to assign the same label number to the label-number-assigned pixels 110 adjacent to each other in order to treat the adjacent pixels as an identical label as described above. The labeler 83 performs the labeling of the date area data 101 by assigning label numbers to the binarized date area data 101 through raster scanning and reorganizing the label numbers using the LUT 120 as necessary.

Figure 20:
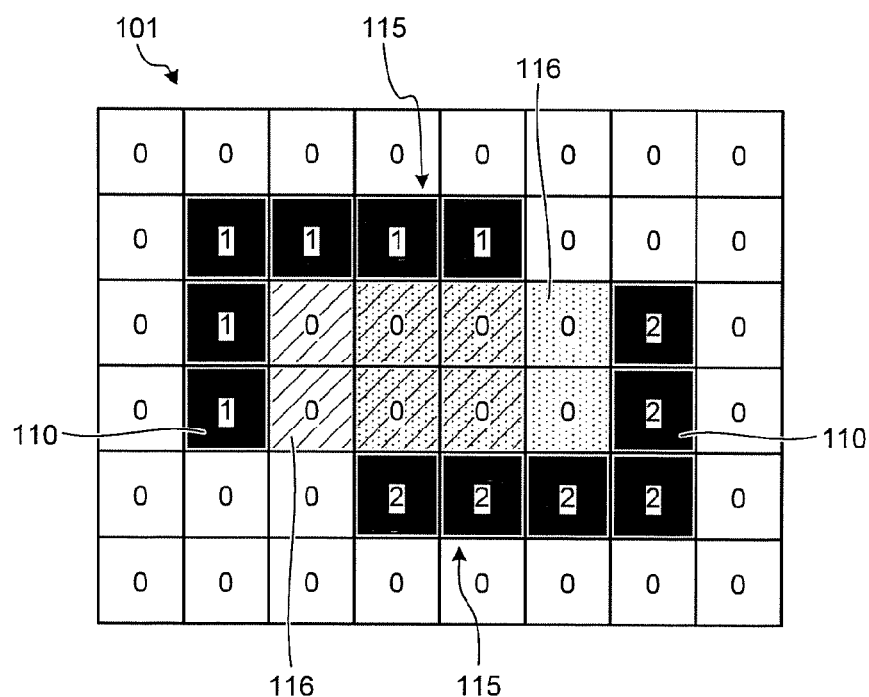
FIG. 20 is an illustration for illustrating a condition in which label areas overlap in part.

When the labeling of the date area data 101 is completed, proximity consolidation of the labels is next performed (step ST32). Specifically, labels spaced apart from each other with a relatively short distance therebetween are consolidated with each other to be treated as one label. FIG. 20 is an illustration for illustrating a condition in which label areas overlap in part. When label areas 116 of the respective labels 115 that are spaced apart from each other overlap each other or a distance between the labels 115 spaced apart from each other falls within a predetermined range, the proximity consolidation consolidates these labels 115 with each other to be treated as one label 115. It is here noted that, as illustrated in FIG. 20, for example, the label area 116 of each label 115 is defined as follows: one label area 116 is an area to a pixel 110 at a lateral end having the same height as that of a pixel 110 at a vertical end in a single label 115 extending in the height direction and the width direction. The two labels 115 having the respective label areas 116 defined as described above overlapping each other are subjected to the proximity consolidation to thereby be treated as one label 115.

Figures 21, 22:
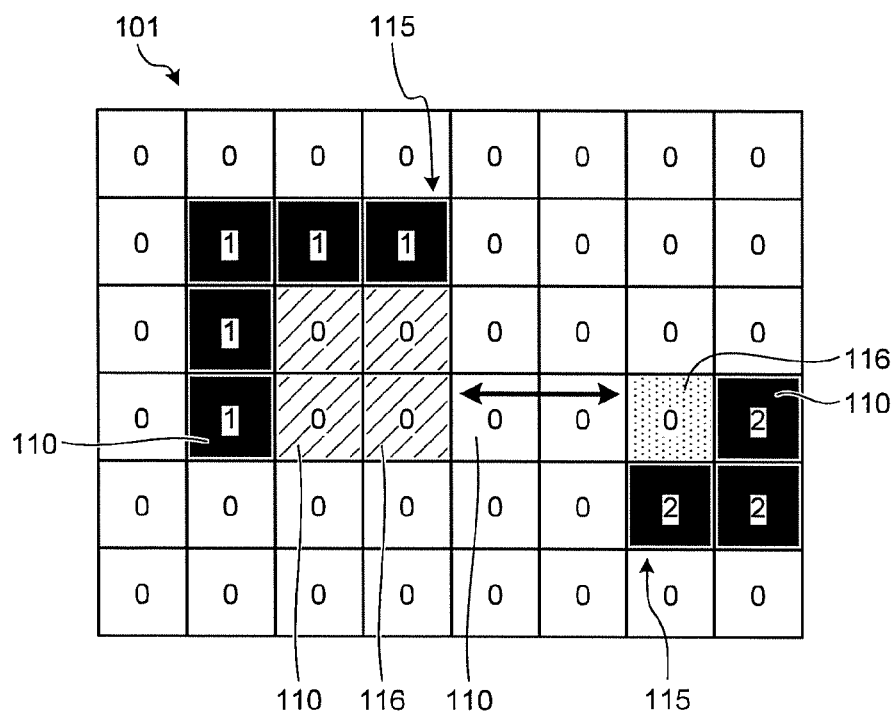
FIG. 21 is an illustration for illustrating a distance between labels.
FIG. 22 is a table illustrating exemplary criteria for determining noise.

FIG. 21 illustrates a distance between labels. Two labels 115 are subjected to the proximity consolidation when the distance therebetween falls within a preset threshold even when the label areas 116 do not overlap each other. For example, assume that five pixels are set for the threshold. When the distance between the two labels 115 is five pixels or less, the two labels 115 are subjected to the proximity consolidation so as to be treated as one label 115.

The labeler 83 that performs the proximity consolidation of the labels 115 as described above extracts a target area data 102, which will be described later (see FIG. 26) representing area data that is identifiable as a numeral from the date area data 101 that has been subjected to the labeling. When the distance between two different labels 115 in the date area data 101 falls within a predetermined value, the labeler 83 extracts the target area data 102 by regarding the different labels 115 as falling within a single piece of the target area data 102.

When the proximity consolidation of the labels 115 is completed, noise removal is performed (step ST33) in order to extract the target area data 102 from the labels 115. In the noise removal, the size and the width-to-height ratio of the label 115 are used to determine a label 115 that is likely to represent any object other than the numeral "1", a label 115 that is likely to represent the numeral "1", and noise as a label 115 not representing a numeral. The label 115 that has been determined to be noise is thereby removed.

FIG. 22 is a table illustrating exemplary criteria for determining noise. To determine whether the label 115 is noise, reference sizes and reference width-to-height ratio of the label 115 are established as illustrated in FIG. 22 and any objects not falling within the established criteria are removed as noise. In the exemplary criteria illustrated in FIG. 22, the reference size of the label 115 that is likely to represent any object other than the numeral "1" is 40×60 in terms of the number of pixels 110 in the width direction and in the height direction, and the reference size of the label 115 that is likely to represent the numeral "1" is 10×30 to 60 in terms of the number of pixels 110 in the width direction and in the height direction. The label 115 that is likely to represent any object other than the numeral "1" has a width (x) to height (y) ratio of 2:3 and the label 115 that is likely to represent the numeral "1" has a width (x) to height (y) ratio of 1:3 to 1:6. The labeler 83 determines whether the size of each of the labels 115 satisfies these criteria and removes any label 115 that does not satisfy the criteria as noise.

The image data 100 of the image of a photo captured by the image capturing unit 70 may often be indistinct. To determine whether a label 115 is noise while making sure not to remove labels 115 representing numerals more than necessary, preferably, an allowable deviation from the criteria is enlarged so as to leave labels 115 that are likely to represent numerals as much as possible.

Figure 23:
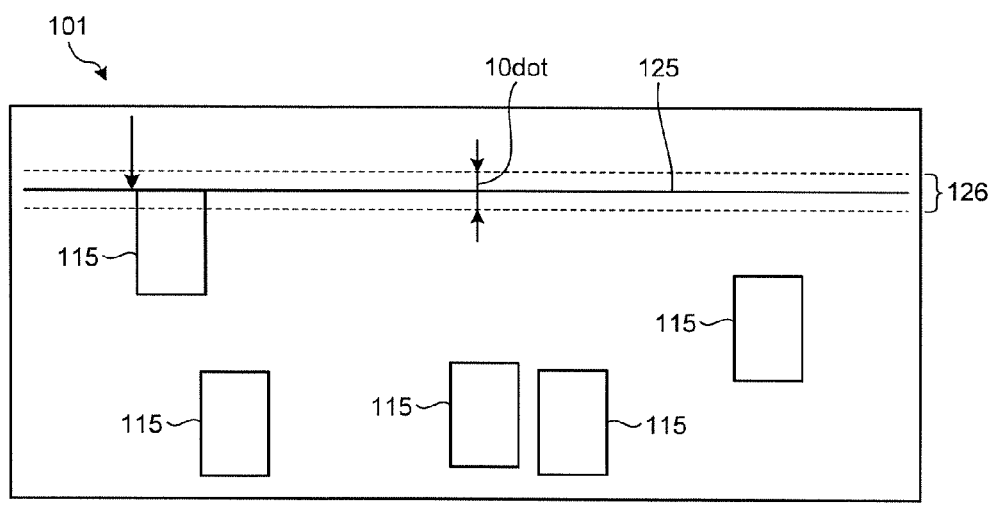
FIG. 23 is an illustration for illustrating noise removal on the basis of a detection line.

To determine whether a label 115 is noise, a detection line 125 is set to make a determination on the basis of the detection line 125. FIG. 23 illustrates how noise is removed on the basis of the detection line. The determination of whether noise is present is made using the detection line 125 as follows. Specifically, the detection line 125 extending in the width direction is set in sequence starting with the uppermost label 115 out of a plurality of labels 115 disposed within the date area data 101 and it is determined whether a label 115 exists within a predetermined range from the detection line 125.

Reference is now made to FIG. 23. The detection line 125 extending in the width direction is set at the upper end position of the uppermost label 115 out of the labels 115 disposed within the date area data 101. With the detection line 125 set, a predetermined range in the height direction with reference to the detection line 125, specifically, for example, a range of five each pixels on both sides in the height direction from the detection line 125, is next set as a detection range 126. Specifically, the detection range 126 is set as a range that extends in the width direction with a width of ten pixels in the height direction.

When the detection range 126 has been set, labels 115 that overlap the detection range 126 are then detected. When two or more labels 115 overlapping the detection range 126 are detected, the position in the height direction of the highest pixel 110 of all the labels 115 that overlaps the detection range 126 is set as an upper end line. Similarly, the position in the height direction of the lowest pixel 110 of all the labels 115 overlapping the detection range 126 is set as a lower end line. With the upper end line and the lower end line set, all labels 115 but the labels 115 disposed between the upper end line and the lower end line are removed as noise. Specifically, the labeler 83 sets the upper end line and the lower end line as described above to thereby define the position between the upper end line and the lower end line in the date area data 101 as an identification line 130 (see FIG. 25), thereby removing the labels 115 disposed outside the identification line 130.

In a case where the detection range 126 has been set and the detection of the labels 115 overlapping the detection range 126 has been conducted, when two or more labels 115 are not detected to overlap the detection range 126, a new detection line 125 is then set using a different label 115 that is disposed at the next highest position out of the labels 115 disposed within the date area data 101 and the same detection procedure is repeated. When the upper end line and the lower end line cannot be set through these repeated procedures, the detection of the identification line 130 is assumed to have failed and all labels 115 are removed.

Figure 24:
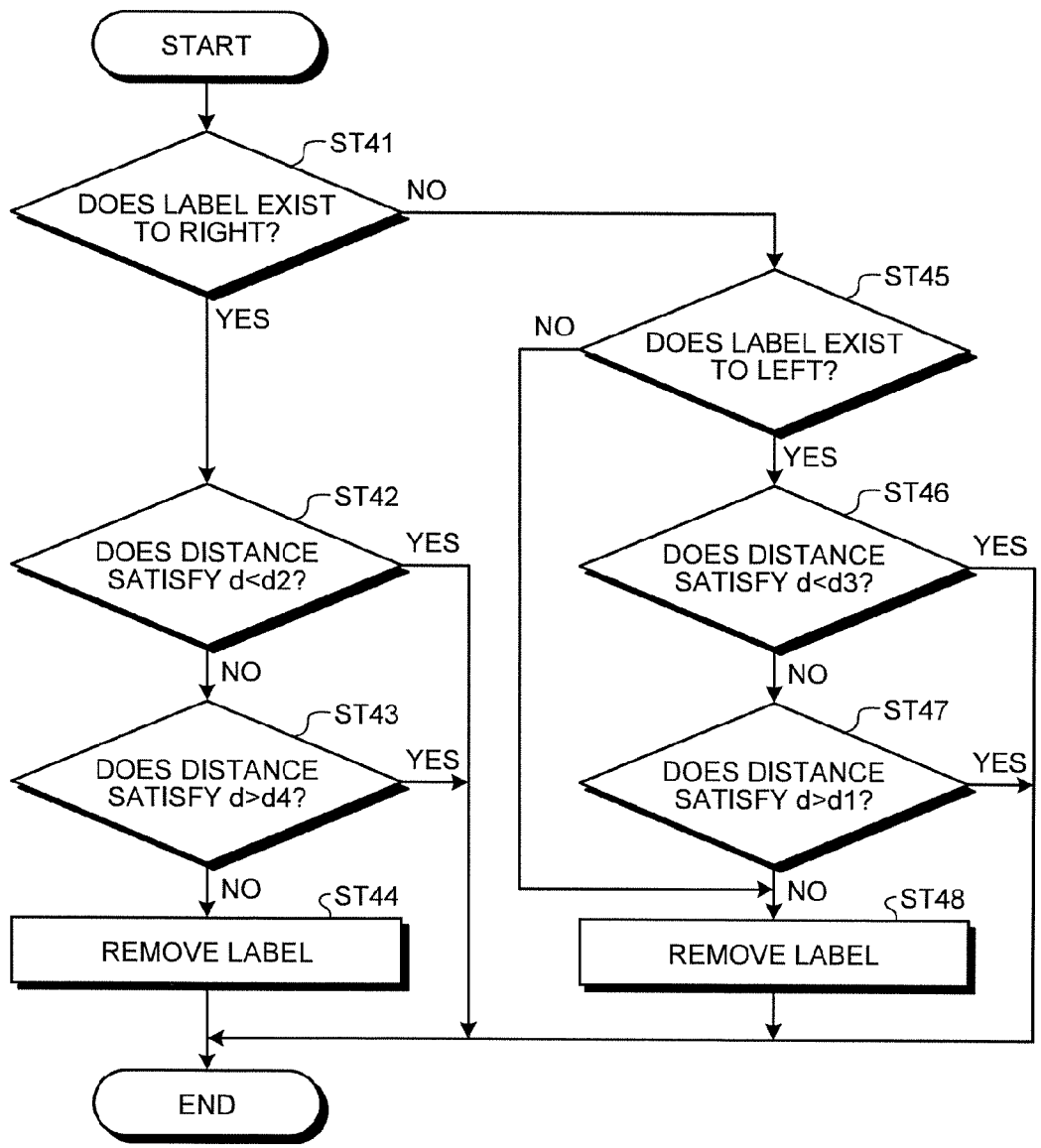
FIG. 24 is a flowchart illustrating processing steps performed when a check is made for labels that are likely to represent the numeral "1"
Figure 25:
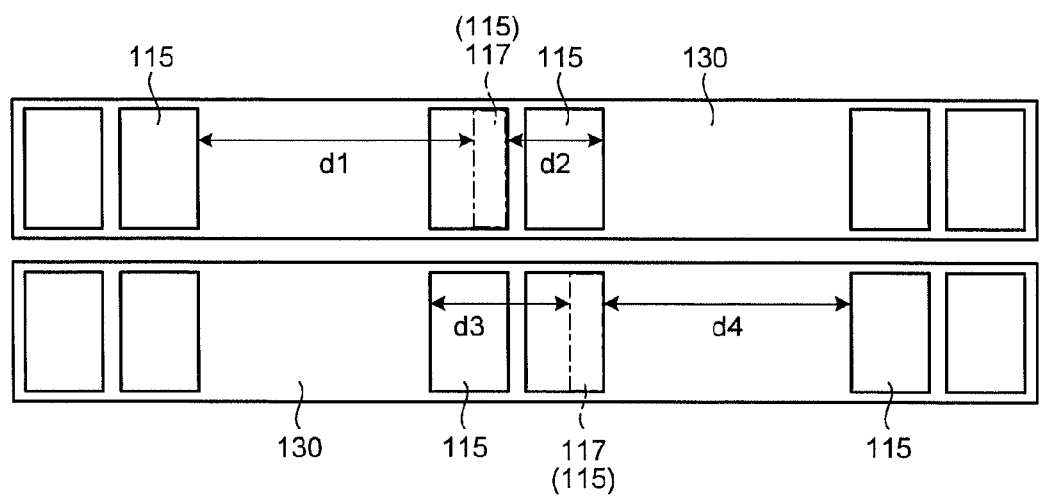
FIG. 25 is an illustration for illustrating checking for labels that are likely to represent the numeral "1"

The noise removal procedure also includes checking for a label 115 that is assumed to represent the numeral "1". FIG. 24 is a flowchart illustrating processing steps performed when a check is made for labels that are likely to represent the numeral "1". FIG. 25 illustrates the checking for labels that are likely to represent the numeral "1". Consider a case in which a check is made for a label 115 that is likely to represent the numeral "1" and that specific label 115 is disposed within the identification line 130. To allow the label 115 to be treated as representing the numeral "1", it is first determined whether the label 115 exists to the right of an interest label 117 (step ST41). In this case, the interest label 117 is the label 115 that is likely to represent the numeral "1" as determined on the basis of the reference size and width-to-height ratio (see FIG. 22) of the label 115.

If it is determined that the label 115 exists to the right of the interest label 117 (Yes at step ST41), it is then determined whether a distance d between the label 115 disposed to the right of the interest label 117 and the interest label 117 satisfies a relation of d<d2 (step ST42). Where the symbol "d2" is frequently set in advance in photos as, when the numeral "1" is used for the date assigned to the photo and the "1" is positioned in the tens place, a distance between the "1" and a numeral in the ones place.

If it is determined that the distance d between the interest label 117 and the label 115 disposed to the right of the interest label 117 satisfies the relation of d<d2 (Yes at step ST42), the operation exits from these steps. Specifically, if it is determined that the distance d between the label 115 disposed to the right of the interest label 117 and the interest label 117 satisfies the relation of d<d2, the interest label 117 is treated as representing the numeral "1".

In contrast, if it is determined that the distance d between the label 115 disposed to the right of the interest label 117 and the interest label 117 does not satisfy the relation of d<d2 (No at step ST42), it is then determined whether the distance d satisfies a relation of d>d4 (step ST43). Where the symbol "d4" is frequently set in advance in photos as, when the numeral "1" is used for the date assigned to the photo and the "1" is positioned in the ones place, a distance between the "1" and a numeral disposed to the right. For example, when the date is assigned in the order of "year, month, and day" and when "1" is used in the ones place of the numeral indicating the "month", d4 is set as the distance between the "1" and the numeral indicating the "day" disposed to the right.

If it is determined that the distance d between the interest label 117 and the label 115 disposed to the right of the interest label 117 satisfies the relation of d>d4 (Yes at step ST43), the operation exits from these steps and the interest label 117 is treated as representing the numeral "1". Specifically, the interest label 117 is treated as the target area data 102 (see FIG. 26) that is likely to represent the numeral "1".

In contrast, if it is determined that the distance d between the interest label 117 and the label 115 disposed to the right of the interest label 117 does not satisfy the relation of d>d4 (No at step ST43), the interest label 117 is removed (step ST44). Specifically, if the distance d between the interest label 117 and the label 115 disposed to the right of the interest label 117 satisfies neither the relation of d<d2 nor the relation of d>d4, it is determined that the interest label 117 does not represent the numeral "1" and is noise. The operation thus removes the interest label 117 and exits from these steps.

Meanwhile, if it is determined that the label 115 does not exist to the right of the interest label 117 (No at step ST41), it is then determined whether the label 115 exists to the left of the interest label 117 (step ST45). If it is determined that the label 115 exists to the left of the interest label 117 (Yes at step ST45), it is then determined whether the distance d between the label 115 disposed to the left of the interest label 117 and the interest label 117 satisfies a relation of d<d3 (step ST46). Where the symbol "d3" is frequently set in advance in photos as, when the numeral "1" is used for the date assigned to the photo and the "1" is positioned in the ones place, a distance between the "1" and a numeral in the tens place.

If it is determined that the distance d between the interest label 117 and the label 115 disposed to the left of the interest label 117 satisfies the relation of d<d3 (Yes at step ST46), the operation exits from these steps. Specifically, if it is determined that the distance d between the label 115 disposed to the left of the interest label 117 and the interest label 117 satisfies the relation of d<d3, the interest label 117 is treated as representing the numeral "1". Specifically, the interest label 117 is treated as the target area data 102 that is likely to represent the numeral "1".

In contrast, if it is determined that the distance d between the label 115 disposed to the left of the interest label 117 and the interest label 117 does not satisfy the relation of d<d3 (No at step ST46), it is then determined whether the distance d satisfies a relation of d>d1 (step ST47). Where the symbol "d1" is frequently set in advance in photos as, when the numeral "1" is used for the date assigned to the photo and the "1" is positioned in the tens place, a distance between the "1" and a numeral disposed to the left. For example, when the date is assigned in the order of "year, month, and day" and when "1" is used in the tens place of the numeral indicating the "month", d1 is set as the distance between the "1" and the numeral indicating the "year" disposed to the left.

If it is determined that the distance d between the interest label 117 and the label 115 disposed to the left of the interest label 117 satisfies the relation of d>d1 (Yes at step ST47), the operation exits from these steps and the interest label 117 is treated as representing the numeral "1". Specifically, the interest label 117 is treated as the target area data 102 that is likely to represent the numeral "1".

In contrast, if it is determined that the distance d between the interest label 117 and the label 115 disposed to the left of the interest label 117 does not satisfy the relation of d>d1 (No at step ST47), the interest label 117 is removed (step ST48). Specifically, if the distance d between the interest label 117 and the label 115 disposed to the left of the interest label 117 satisfies neither the relation of d<d3 nor the relation of d>d1, it is determined that the interest label 117 does not represent the numeral "1" and is noise. The operation thus removes the interest label 117 and exits from these steps. If it is determined that the label 115 does not exist to the right of the interest label 117 (No at step ST41) and that the label 115 does not exist to the left of the interest label 117, either (No at step ST45), the operation similarly removes the interest label 117 (step ST48) and exits from these steps.

Through the foregoing steps, the labeler 83 removes noise from the date area data 101 and sets the identification line 130 to thereby extract, as the target area data 102 (see FIG. 26) that is identifiable as a numeral, the labels 115 that are likely to represent numerals from the labels 115 detected within the identification line 130. When the labeler 83 has removed noise and extracted the target area data 102, identification of a date numeral is then performed (step ST34). The identification of the date numeral is performed through performance of a projection histogram on the target area data 102.

Figure 26:
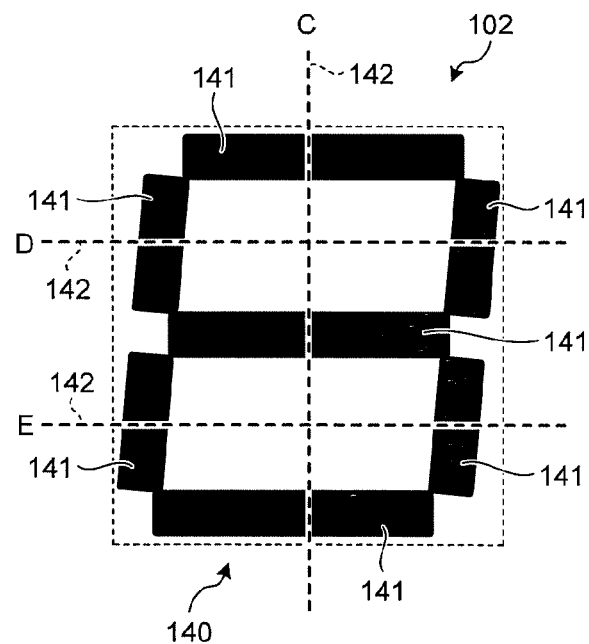
FIG. 26 is an illustration for illustrating a projection histogram technique.

FIG. 26 illustrates a projection histogram technique. When a projection histogram is performed on the target area data 102 as the label 115 that is identifiable as a numeral, the numeral identifier 84 of the image processing module 80 in the external device 3 first sets, with respect to the target area data 102, a projection line 142 at a position at which a segment 141 that constitutes a numeral can be extracted. Specifically, the date identification apparatus 1 according to the embodiment is intended for use in identifying a numeral when the date assigned to a photo to be identified is a seven-segment character 140 composed of seven segments 141, so that the projection line 142 is set at the position at which the seven-segment character 140 can be identified.

Specifically, the seven-segment character 140 is composed of seven segments arranged as follows: three horizontal segments 141 extending in the width direction and disposed at an upper end, a center, and a lower end of the seven-segment character 140; two vertical segments 141 disposed on left and right ends of the two horizontal segments 141 disposed at the upper end and the center of the seven-segment character 140 in the height direction to thereby connect the two horizontal segments 141; and two vertical segments 141 disposed on left and right ends of the two horizontal segments 141 disposed at the center and the lower end of the seven-segment character 140 in the height direction to thereby connect the two horizontal segments 141. To extract each of the states of the seven segments 141, three projection lines 142 of line C, line D, and line E are set.

Of these three lines, line C is projected in the height direction at a position near a center of the target area data 102 in the width direction to extract a histogram, whereby the states of the three horizontal segments 141 arranged in the height direction are thereby extracted. Line D is projected in the with direction at a position between the horizontal segment 141 disposed at the upper end in the height direction and the horizontal segment 141 disposed at the center in the height direction to extract a histogram, whereby the states of the two vertical segments 141 disposed at the left and right ends of the two horizontal segments 141 are thereby extracted. Line E is projected in the with direction at a position between the horizontal segment 141 disposed at the center in the height direction and the horizontal segment 141 disposed at the lower end in the height direction to extract a histogram, whereby the states of the two vertical segments 141 disposed at the left and right ends of the two horizontal segments 141 are thereby extracted. As such, the numeral identifier 84 performs a histogram on the target area data 102 using the projection lines 142 of line C, line D, and line E, thereby identifying the numeral on the basis of a peak count in each of the three lines.

Figure 27A:
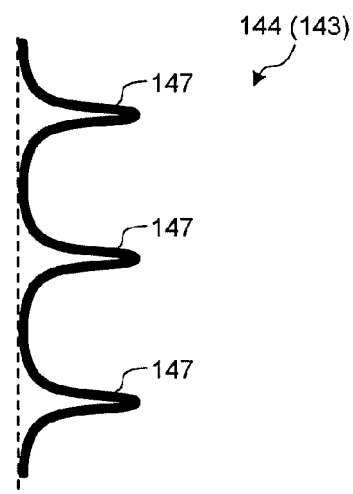
FIG. 27A is an illustration for illustrating a histogram performed on a target area data illustrated in FIG. 26 using a projection line of line C.

FIG. 27A illustrates a histogram performed on the target area data illustrated in FIG. 26 using the projection line of line C. Performing the histogram on the target area data 102 using the three projection lines 142 yields a result of a projection histogram 143 on which portions at which the segments 141 are disposed appear as histogram peak portions 147. For example, the numeral "8" may be indicated by the seven-segment character 140 on the target area data 102 as illustrated in FIG. 26. In this case, three peak portions 147 corresponding to the three horizontal segments 141 arranged in the height direction appear in a line-C histogram 144 as the projection histogram 143 using the line-C projection line 142.

Figure 27B:
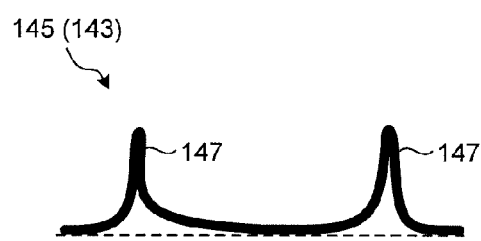
FIG. 27B is an illustration for illustrating a histogram performed on the target area data illustrated in FIG. 26 using a projection line of line D.
Figure 27C:
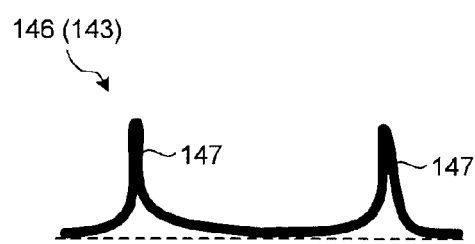
FIG. 27C is an illustration for illustrating a histogram performed on the target area data illustrated in FIG. 26 using a projection line of line E.

FIG. 27B illustrates a histogram performed on the target area data illustrated in FIG. 26 using the projection line of line D. FIG. 27C illustrates a histogram performed on the target area data illustrated in FIG. 26 using the projection line of line E. Two peak portions 147 corresponding to the two vertical segments 141 disposed on the left and right ends of the two horizontal segments 141 disposed at the upper end and the center in the height direction appear in a line-D histogram 145 as the projection histogram 143 using the line-D projection line 142. Similarly, two peak portions 147 corresponding to the two vertical segments 141 disposed on the left and right ends of the two horizontal segments 141 disposed at the center and the lower end in the height direction appear in a line-E histogram 146 as the projection histogram 143 using the line-E projection line 142. The numeral identifier 84 identifies the numeral indicated by the target area data 102 on the basis of the number of peak portions 147 that appear on the projection histogram 143 as described above.

FIG. 28 is a table that illustrates a relation between the peak portions and the numeral when the numeral is to be identified on the basis of the peak portions of the projection histogram. The relation between the peak portions 147 and a numeral indicated by the seven-segment character 140 when the numeral is to be identified on the basis of the peak portions 147 of the projection histogram 143 is illustrated in FIG. 28. Consider, for example, a case in which three peak portions 147 appear in the line-C histogram 144, one peak portion 147 appears only at a position corresponding to the right vertical segment 141 in the line-D histogram 145, and one peak portion 147 appears only at a position corresponding to the left vertical segment 141 in the line-E histogram 146. This case leads to a reasonable determination that the numeral "2" formed of the seven-segment character 140 appears on the target area data 102.

With the numeral "1", the numeral identifier 84 identifies the numeral "1" on the basis of the number of peak portions 147 in the projection histogram 143 and the abovementioned distance between the interest label 117 and the label 115 adjacent thereto, specifically, the distance between the two pieces of the target area data 102 adjacent to each other.

When the identification of the date numeral by the numeral identifier 84 is completed, a check is made of an identification result (step ST35). To make the check of the identification result, a check is first made of the number and positions of the recognized numerals. Specifically, the identification is determined to have been successful, if the numerals that have been identified are in three areas and include four or more characters without misidentified labels 115.

If there is any misidentified label 115, a binary histogram is extracted within the range of the label 115 in question. In addition, feedback values for the binarization step (see FIG. 12) are determined on the basis of percentage of black in the binary histogram.

The following describes exemplary values to be determined for the feedback. If the percentage of black when the histogram is extracted of the label 115 is between 0 and 10%, the sliceV as the condition for calculating the threshold for binarization using the value histogram is raised by two steps from the current condition. For example, if the condition V1 and the condition V2 as the value conditions are the default 80% and 40%, respectively, each of the conditions is raised by two steps. In this case, one step equals about five when the value is given by 0 to 255 grayscale levels.

If the percentage of black when the histogram is extracted of the label 115 is between 10 and 50%, the sliceV is raised by one step from the current condition. If the percentage of black when the histogram is extracted of the label 115 is between 50 and 90%, the sliceV is lowered by one step from the current condition. If the percentage of black when the histogram is extracted of the label 115 is between 90 and 100%, the sliceV is lowered by two steps from the current condition.

If the identification of the date numeral has not been successful, but the identification line 130 (see FIG. 25) has been detected within the date area data 101, a binary histogram is extracted in the identification line 130. If the identification of the date numeral has not been successful and the identification line 130 has not been detected, a binary histogram is extracted generally in the date area data 101. The feedback values for the binarization step are to be determined on the basis of the percentage of black in the binary histogram also when the binary histogram is extracted in the identification line 130 or the date area data 101.

If the percentage of black when the histogram is extracted in the identification line 130 or the date area data 101 is between 0 and 20%, for example, the sliceV is raised by two steps from the current condition. If the percentage of black when the histogram is extracted in the identification line 130 or the date area data 101 is between 20 and 50%, the sliceV is raised by one step from the current condition. If the percentage of black when the histogram is extracted in the identification line 130 or the date area data 101 is between 50 and 80%, the sliceV is lowered by one step from the current condition. If the percentage of black when the histogram is extracted in the identification line 130 or the date area data 101 is between 80 and 100%, the sliceV is lowered by two steps from the current condition.

If the numerals that have been identified are in three areas and include four or more characters without misidentified labels 115 as a result of the foregoing determinations, the identification is determined to have been successful (Yes at step ST35) and shaping of a date format is performed (step ST36). Specifically, the date data assigner 85 of the image processing module 80 in the external device 3 creates date data to be assigned to the image data 100.

In contrast, if the numerals that have been identified are not in three areas or do not include four or more characters, or if misidentified labels 115 are present, the identification is determined to have been unsuccessful (No at step ST35) and the determined sliceV is fed back to the binarization step (step ST37).

When the shaping of the date format has been performed (step ST36) or feedback has been provided to the binarization step (step ST37), the operation terminates the identification step subroutine and returns to the former process (see FIG. 10). Having returned from the identification step to the former process, the operation next performs an identification check (step ST17). Specifically, it is determined in the identification step whether the identification of the numeral is determined to have been successful. If the identification of the numeral is determined to have been successful (Yes at step ST35) and the shaping of the date format is completed (step ST36), it is confirmed that the identification of the numeral is completed (Yes at step ST17) and thus the date data is assigned (step ST18). Specifically, the date data assigner 85 assigns the date data created through the shaping of the date format to the image data 100. This process assigns the date assigned through printing onto the photo having the image captured as the image data 100 to the image data 100 as the date data, thus completing the process of identifying the date assigned to the photo and assigning the date data to the image data 100.

In contrast, if the identification of the numeral is determined to have been unsuccessful (No at step ST35), the identification of the numeral is not completed (No at step ST17), so that the operation returns to the binarization step (step ST15). Specifically, the subroutine for performing the binarization step is called again (see FIG. 12). In the subroutine, a determination is made as to whether the current binarization step is in a first sequence (step ST21). Because the current step is in a second sequence after the first sequence, it is determined that the current step is not in the first sequence (No at step ST21).

If it is determined that the current binarization step is not in the first sequence, the value for binarization is updated (step ST25). The feedback data (step ST37) provided for the binarization step in the identification step is used for the updating of the value. Specifically, the sliceV is updated using the value of the sliceV determined in the identification step as the specified value for the sliceV used in the binarization step. Specifically, the condition V1 and the condition V2 applicable when the threshold for the binarization is calculated from the value histogram are changed to the value determined in the identification step.

When the condition V1 and the condition V2 are updated, the data that has undergone the histogram analysis is subjected to binarization using the updated condition V1 and condition V2 (step ST24). Specifically, if the numeral identifier 84 has failed in identifying the numeral, the binarization converter 82 binarizes the date area data 101 using the changed threshold. In this case, the binarization converter 82 performs binarization with reference to an area in which the identification fails. For example, if a numeral of one label 115 cannot be identified, only that particular label 115 is binarized. If a label 115 the numerals of which are in three areas and include four or more characters cannot be identified in the identification line 130 (see FIG. 25), the binarization is performed in the identification line 130. If the identification line 130 cannot be detected, the binarization is performed generally in the date area data 101.

Completing the binarization using the sliceV with an updated value, the operation returns to the former process and calls the identification step subroutine to perform the identification step (step ST16). If this identification step results in the identification of the numeral being completed, the date data is assigned to the image data 100 (step ST18) to complete the process. If the identification step does not result in the identification of the numeral being completed, feedback data of the value used in the binarization is provided from the identification step to the binarization step (step ST37), so that the binarization step is performed again (step ST15).

As described above, the date identification apparatus 1 according to the embodiment provides the binarization step with feedback information on the result of the identification step, thereby appropriately identifying the numeral assign as a date to the photo.

The date identification apparatus 1 in the embodiment performs the binarization step using hue and value (or luminance). With the value, the date identification apparatus 1 sets a plurality of conditions for calculating the threshold for the binarization. This arrangement enables a binarized image to be obtained for each value condition, so that the two binarized images can compensate for difficulties the date identification apparatus 1 encounters during the image identification.

Figure 29A:
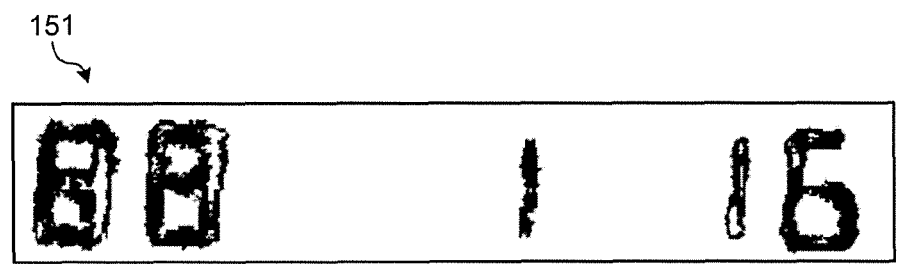
FIG. 29A illustrates an image when an image of a date on an ordinary photo is binarized using a single condition.
Figure 29B:
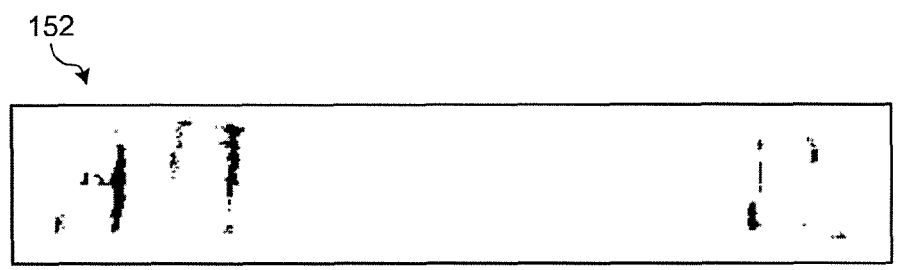
FIG. 29B illustrates an image when the image of the date on the ordinary photo is binarized using another single condition.
Figure 29C:
FIG. 29C illustrates an overlay image that represents the image illustrated in FIG. 29B laid over the image illustrated in FIG. 29A.

FIG. 29A illustrates an image when an image of a date on an ordinary photo is binarized using a single condition. FIG. 29B illustrates an image when the image of the date on the ordinary photo is binarized using another single condition. FIG. 29C illustrates an overlay image that represents the image illustrated in FIG. 29B laid over the image illustrated in FIG. 29A. Consider, for example, a case in which the date area data 101 of an ordinary photo is binarized using two value conditions. In this case, a first binarized image 151 and a second binarized image 152 can be obtained as binarized images under the respective value conditions. In such a case, identification of the numerals may be difficult depending on the binarized image, specifically, the condition of the original photo. Laying the second binarized image 152 over the first binarized image 151 to make an overlay image 150, however, allows the numerals to be identified, thereby making a date 155 identifiable.

Figure 30A:
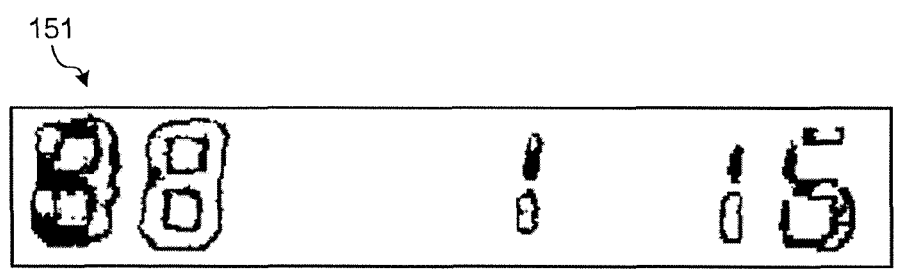
FIG. 30A illustrates an image when an image of a date on a photo having a complicated pattern as a background of the date is binarized using a single condition.
Figure 30B:
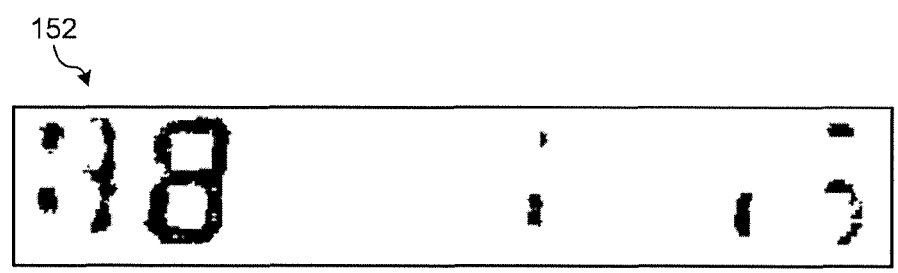
FIG. 30B illustrates an image when the image of the date on the photo having the complicated pattern as the background of the date is binarized using another single condition.
Figure 30C:
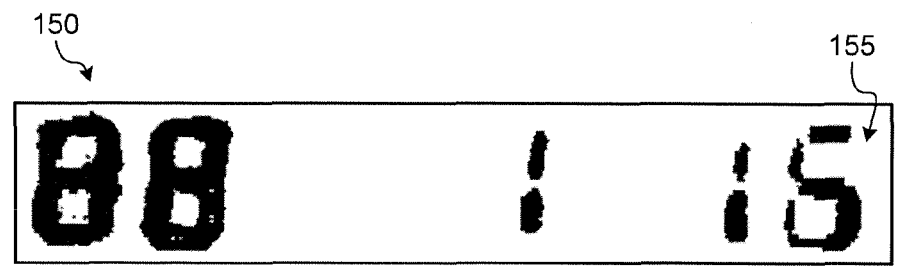
FIG. 30C illustrates an overlay image that represents the image illustrated in FIG. 30B laid over the image illustrated in FIG. 30A.

FIG. 30A illustrates an image when an image of a date on a photo having a complicated pattern as a background of the date is binarized using a single condition. FIG. 30B illustrates an image when the image of the date on the photo having the complicated pattern as the background of the date is binarized using another single condition. FIG. 30C illustrates an overlay image that represents the image illustrated in FIG. 30B laid over the image illustrated in FIG. 30A. In photos having a complicated pattern as the background of the date, the value of the date is often close to the value of the background, which makes it difficult to identify the date. Also in such a case, laying the second binarized image 152 over the first binarized image 151, each being binarized using a unique value condition, to make the overlay image 150, allows the numerals to be identified, thereby making the date 155 identifiable.

Figure 31A:
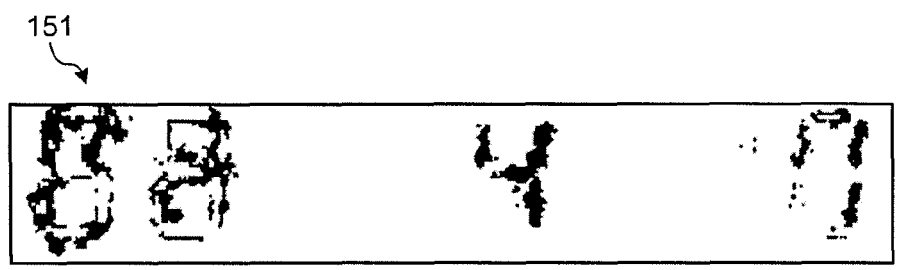
FIG. 31A illustrates an image when an image of a date on a photo having a date and a background in a similar color is binarized using a single condition.
Figure 31B:
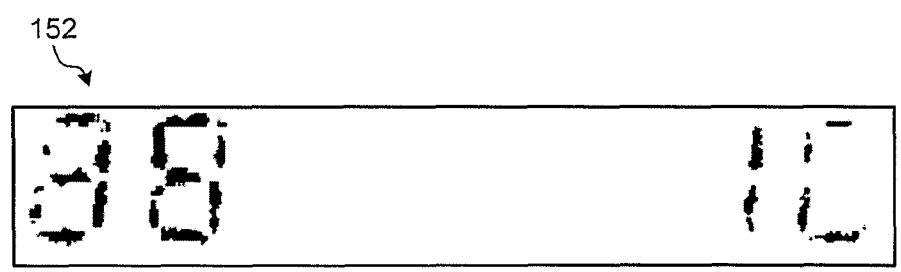
FIG. 31B illustrates an image when the image of the date on the photo having the date and the background in a similar color is binarized using another single condition.
Figure 31C:
FIG. 31C illustrates an overlay image that represents the image illustrated in FIG. 31B laid over the image illustrated in FIG. 31A.

FIG. 31A illustrates an image when an image of a date on a photo having a date and a background in a similar color is binarized using a single condition. FIG. 31B illustrates an image when the image of the date on the photo having the date and the background in a similar color is binarized using another single condition. FIG. 31C illustrates an overlay image that represents the image illustrated in FIG. 31B laid over the image illustrated in FIG. 31A. In photos having the date and the background in a similar color, the hue of the date is close to the hue of the background, which makes it difficult to identify the date. Also in such a case, laying the second binarized image 152 over the first binarized image 151, each being binarized using two value conditions, to make the overlay image 150, allows the numerals to be identified, thereby making the date 155 identifiable.

When the date identification apparatus 1 in the embodiment identifies the date 155, performing the identification on the basis of the target area data 102 in the overlay image 150 makes it easy to identify the date 155 regardless of the condition of the photo.

When the date identification apparatus 1 fails to identify the numeral through the binarization step and the identification step, the result of the identification step performed by the numeral identifier 84 is fed back to the binarization step and the binarization converter 82 performs the binarization on the basis of the value of the result of the identification step fed back thereto. When the feedback is performed a predetermined number of times with respect to a single piece of the date area data 101, however, the binarization step and the identification step are terminated. In this case, the date assigned to the photo is assigned as date data to the image data 100 through an input operation for the date data performed by the user on the display unit 71 of the external device 3.

As such, the display unit 71 of the external device 3 functions also as a date input unit on which the input operation for the date data to be assigned to the image data 100 is performed. When the binarization converter 82 has changed the threshold a predetermined number of times, the date data assigner 85 switches assignment of the date data to the image data 100 from the assignment of the date identified by the numeral identifier 84 to the assignment of the date through the input operation on the display unit 71.

For example, when the binarization converter 82 has changed the threshold a predetermined number of times, in order to prompt the user to perform the input operation for the date, a message something to the effect that the date cannot be identified is displayed on the display unit 71 and another message that prompts the user to perform the input operation for the date on the display unit 71 is displayed on the display unit 71. When the user has input the date assigned to the photo on the display unit 71 in accordance with the display on the display unit 71, the date data assigner 85 assigns the input date to the image data 100. This alternative arrangement allows the date not identified by the numeral identifier 84 to be assigned to the image data 100.

When identifying the date assigned to the photo, the date identification apparatus 1 according to the embodiment described above binarizes the date area data 101 using the thresholds on the basis of the value (or luminance) and the hue. This approach enables the date identification apparatus 1 to extract the date portion from the date area data 101 even more reliably. Additionally, the date identification apparatus 1 performs a histogram using the plurality of projection lines 142 on the target area data 102 extracted from the binarized date area data 101 and identifies the numeral on the basis of the number of peak portions 147 in each of the projection lines 142. This approach enables the numeral to be identified with high accuracy and ease. As a result, the date on the photo can be appropriately identified. The appropriate identification of the date on the photo allows the date on any old photo to be appropriately identified to thereby assign the date data to the image data 100, thus enhancing convenience of the user.

When the date assigned to the photo is identified, instead of performing identification on the entire image data 100, the date area data 101 to which the date is assumed to be assigned is isolated and subjected to the binarization step and the identification step. This approach can reduce an amount of operations. As a result, the date on the photo can be appropriately identified without an apparatus that offers a high information processing capacity. Having no necessity to use an apparatus offering a high information processing capacity allows cost of manufacturing the date identification apparatus 1 to be reduced.

If the numeral identifier 84 fails to identify the numeral, the binarization converter 82 changes the threshold to binarize the date area data 101. This arrangement increases the possibility of obtaining a binarized image from which the numeral can be identified. This increases the possibility of identifying the numeral, so that the date on the photo can be more reliably identified.

When the binarization converter 82 has changed the threshold a predetermined number of times, the assignment of the date data to the image data 100 is switched to the assignment through the input operation on the display unit 71 of the external device 3. This arrangement not only reduces the amount of operations required for assigning the date data to the image data 100, but also allows the date data to be assigned more reliably. As a result, the date on the photo can be appropriately identified without an apparatus that offers a high information processing capacity, so that the cost of manufacturing the date identification apparatus 1 can be reduced.

When the distance between two different labels 115 in the date area data 101 that has undergone the labeling processing falls within a predetermined value, the target area data 102 is extracted on the basis that the different labels are regarded as falling within a single piece of the target area data 102. This arrangement allows the target area data 102 for identifying the numeral to be extracted from the labels 115 more appropriately. As a result, the date on the photo can be identified more reliably.

Because the numeral "1" is identified on the basis of the distance between the two pieces of the target area data 102 adjacent to each other, the numeral "1" that tends to be identified as noise can be more reliably identified as the numeral "1". As a result, the date on the photo can be identified more reliably.

Modification

While the date identification apparatus 1 in the embodiment described above includes the housing 2 and the external device 3 formed separately from each other, the date identification apparatus 1 may be formed into a single unit integrating the housing 2 with the external device 3. The date identification apparatus 1 may be configured, for example, so that the housing 2 includes the image capturing unit 70 to thereby allow the housing 2 to capture the image for identifying the date. The date identification apparatus 1 may be configured in any manner and is required only to capture an image of the photo to which a date is assigned, identify the date on the basis of the image data 100 of the captured image, and assigns the identified date data to the image data 100.

The date identification apparatus 1 in the embodiment described above sets the condition H1 and the condition H2 for the hue conditions to be used for binarizing the date area data 101 and defines the condition H1 to be ±40 degrees and the condition H2 to be ±80 degrees. The hue condition values may be defined otherwise. The hue condition values are required only to allow the date portion to be appropriately extracted when the date area data 101 is binarized.

The date identification apparatus 1 in the embodiment described above specifies the sliceV value based on the percentage of black as a value to be fed back to the binarization step when the numeral could not be identified. The feedback value may be set otherwise as appropriate when such a value allows the numeral to be identified through appropriate binarization.

The date identification apparatus according to the present disclosure exerts an effect of enabling appropriate identification of the date on the photo.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A date identification apparatus comprising:
    an isolator that isolates, out of image data generated through capturing of an image of a medium to which a date is assigned using seven-segment characters, date area data to which the date is estimated to be assigned;
    a binarization converter that binarizes the date area data using a threshold based on luminance and hue;
    a labeler that subjects the binarized date area data to labeling to extract target area data that is identifiable as a numeral;
    a numeral identifier that performs a histogram on at least the target area data using a plurality of lines and identifies a numeral on a basis of a peak count in each of the lines; and
    a date data assigner that assigns date data based on the identified numeral to the image data.

2. The date identification apparatus according to claim 1, wherein, when the numeral identifier fails to identify the numeral, the binarization converter changes the threshold to binarize the date area data.

3. The date identification apparatus according to claim 2, further comprising:
    a date input unit on which an input operation for the date data to be assigned to the image data is performed, wherein
    when the binarization converter has changed the threshold a predetermined number of times, assignment of the date data to the image data is switched to the assignment through the input operation on the date input unit.

4. The date identification apparatus according to claim 1, wherein, when a distance between different labels in the date area data that has undergone the labeling processing falls within a predetermined value, the labeler extracts the target area data by regarding the different labels as falling within a single piece of the target area data.

5. The date identification apparatus according to claim 1, wherein the numeral identifier identifies a numeral "1" on a basis of the peak count in each of the lines of the histogram on the target area data and a distance between two pieces of the target area data adjacent to each other.

6. A date identification apparatus comprising:
    an image capturing unit configured to capture an image of a medium to which a date is assigned using a character composed of a plurality of basic symbols and to generate image data based on the image of the medium; and
    at least one processor comprising hardware, the at least one processor being configured to execute:
    an isolation operation for isolating, out of the image data generated by the image capturing unit, date area data to which the date is estimated to be assigned;
    a binarization operation for binarizing the date area data using a threshold based on luminance and hue;
    a labeling operation for subjecting the binarized date area data to labeling to extract target area data that is identifiable as a numeral corresponding to the date assigned to the image captured by the image capturing unit;
    a numeral identification operation for performing a histogram on at least the target area data using a plurality of projection lines and identifying a numeral on a basis of a peak count in each of the projection lines; and
    a date data assignment operation for assigning date data based on the identified numeral to the image data.

* * * * *